US009583122B2

(12) United States Patent
Pinhas

(10) Patent No.: US 9,583,122 B2
(45) Date of Patent: Feb. 28, 2017

(54) PORTABLE TURNTABLE DEVICE, SYSTEM, AND METHOD

(71) Applicant: LOVE TURNTABLE, INC., Los Angeles, CA (US)

(72) Inventor: Charles-Henri Pinhas, Los Angeles, CA (US)

(73) Assignee: Love Turntable, Inc., Los Angeles, CA (US)

( * ) Notice: Subject to any disclaimer, the term of this patent is extended or adjusted under 35 U.S.C. 154(b) by 0 days.

(21) Appl. No.: 15/215,458

(22) Filed: Jul. 20, 2016

(65) Prior Publication Data

US 2017/0025134 A1    Jan. 26, 2017

Related U.S. Application Data

(60) Provisional application No. 62/194,924, filed on Jul. 21, 2015.

(51) Int. Cl.
| | | |
|---|---|---|
| *G11B 17/00* | (2006.01) | |
| *G11B 3/46* | (2006.01) | |
| *G11B 21/00* | (2006.01) | |
| *G11B 21/10* | (2006.01) | |
| *G11B 21/26* | (2006.01) | |
| *G11B 3/60* | (2006.01) | |
| *G11B 17/04* | (2006.01) | |

(52) U.S. Cl.
CPC ............... *G11B 3/46* (2013.01); *G11B 3/60* (2013.01); *G11B 17/00* (2013.01); *G11B 17/04* (2013.01); *G11B 21/006* (2013.01); *G11B 21/106* (2013.01); *G11B 21/26* (2013.01)

(58) Field of Classification Search
CPC .................................. G11B 7/04; G11B 17/00

USPC .......... 720/724; 369/95, 272.1, 275.1, 275.5, 369/280, 283

See application file for complete search history.

(56) References Cited

U.S. PATENT DOCUMENTS

| | | |
|---|---|---|
| 1,462,867 A | 7/1923 | Meyer et al. |
| 3,181,870 A | 5/1965 | Lasswell, Jr. |
| 3,360,269 A | 12/1967 | Dunn |
| 3,482,841 A | 12/1969 | Doring |
| 4,166,624 A | 9/1979 | Mori et al. |

(Continued)

FOREIGN PATENT DOCUMENTS

| | | |
|---|---|---|
| JP | 3130648 | 4/2007 |
| KR | 1020090010813 | 1/2009 |

OTHER PUBLICATIONS

Korean Intellectual Property Office, International Search Report, Oct. 18, 2016, 3 pages.

(Continued)

*Primary Examiner* — Allen T Cao
(74) *Attorney, Agent, or Firm* — Hankin Patent Law, APC; Kevin Schraven; Anooj Patel

(57) ABSTRACT

A turntable device, comprising: a base and an arm. The base may comprise a pad and a spindle. The arm may comprise: a housing; one or more buttons; a spindle engagement portion; a stylus cartridge; a power supply; one or more wireless communication devices; a linear actuator; a motor; and a vertical solenoid. The base may receive a phonographic record, and the spindle engagement portion may engage with the spindle, such that the arm is entirely supported above said base via said spindle and only the spindle.

20 Claims, 23 Drawing Sheets

(56) References Cited

U.S. PATENT DOCUMENTS

| | | |
|---|---|---|
| 4,232,202 A | 11/1980 | Mori et al. |
| 4,360,906 A | 11/1982 | Shitama |
| 4,498,164 A | 2/1985 | Lebensfeld |
| 4,740,945 A | 4/1988 | Doring |
| 6,477,128 B1 | 11/2002 | Ma |
| 9,266,376 B1 * | 2/2016 | Mah ................. H04N 5/232 |
| 2004/0005138 A1 | 1/2004 | Yano et al. |
| 2007/0061825 A1 | 3/2007 | Te et al. |

OTHER PUBLICATIONS

Korean Intellectual Property Office, Written Opinion of the International Searching Authority, Oct. 18, 2016, 4 pages.

\* cited by examiner

PORTABLE TURNTABLE DEVICE, SYSTEM, AND METHOD

CROSS-REFERENCE TO RELATED APPLICATIONS

This U.S. Non-Provisional patent application claims the benefit of U.S. Provisional Patent Application No. 62/194,924, filed on Jul. 21, 2015, titled "Portable Record Player System and Method", by sole inventor Charles-Henri Pinhas, the contents of which are expressly incorporated herein by this reference as though set forth in their entirety.

FIELD

The present disclosure relates generally to devices and methods for reading and transmitting data from disc-shaped media, and more particularly, to one or more portable record playing systems for reading and transmitting sonic data from a phonograph record disk wherein the disk remains stationary.

BACKGROUND

Music players such as phonographs and gramophones have existed since the late 19th century. While earlier versions of record players lacked fidelity, record players improved substantially throughout the 20th century, eventually producing an optimal balance of sound fidelity and a soulful quality. However, once music players migrated away from the use of vinyl disks and towards modern digital mobile music devices, the soulful sound quality that is unique to vinyl records appeared to be lost forever.

For those music aficionados that have continued to play vinyl records, conventionally available record players include certain deficiencies. For example, traditional record turntables are typically large, rectangular, and heavy. Although portable record players are currently available, these devices typically incorporate an integrated speaker that produces poor sound quality. Moreover, some past portable record players apply undesirable pressure directly to the face of record. In the 1970s, some of these portable record players were often referred to as "Vinyl Killers", which are generally portable record players, resembling a vehicle, that scan the record while traveling around the record. These portable record players were known as Vinyl Killers because the records likely became damaged due to the fact that the weight of the portable record player sat directly on the record. While certain high-price portable turntable devices are available, these devices lack automatic and wireless features. These devices are also complex, made for professionals, and are generally unavailable to the typical vinyl record consumer.

In the late 1990s, the music industry essentially stopped the mass market production and sale of vinyl records, with the exception of sales to professional DJs. Recently, however, the demand has been rising for vinyl records. In response to this demand, the financially-struggling record companies have started producing and selling vinyl records on a mass market basis, including both new artists and superstar artists. Record companies have begun releasing vinyl singles, while independent artists have begun releasing vinyl records once given the opportunity. There are now numerous vinyl record re-releases of previously-released and unreleased albums and singles.

This strong reemergence of vinyl has become so popular that it is no longer considered to be a fad or a niche market. It has become apparent, however, that very few vinyl consumers are interested in buying new turntables because turntables are too large, difficult to set up, and arduous to use on a daily basis. Furthermore, turntables are generally incompatible with smart phone/multimedia devices. Regarding those rare wireless turntables, these turntables typically include an FM signal which is an utterly unnecessary feature.

Based on the foregoing, what is needed is an improved, portable record playing device, system, and method for reading data from a stationary vinyl record and wirelessly interfacing with a computing device in a manner which is intuitive and user friendly. The device will preferably minimize the weight applied to the face of the record and will capture the soulful sound qualities of the vinyl record. Features such as one-touch operation and the ability to remotely control the position of the stylus over the face of the record via the interfaced computing device may also be preferable.

SUMMARY OF EMBODIMENTS

To minimize the limitations in the cited references, and to minimize other limitations that will become apparent upon reading and understanding the present specification, the present specification discloses a new and improved portable turntable device. The portable turntable preferably comprises a base and an arm that interconnect around a vinyl record, wherein the arm revolves around the turntable. The only component of the turntable that rest on a top face of the record is preferably the stylus.

One embodiment may be a turntable device, comprising: a base having a pad and a spindle; and an arm, comprising: a housing; one or more buttons; a spindle engagement portion; a stylus cartridge; a power supply; one or more wireless communication devices; a linear actuator; a motor; and a vertical solenoid; wherein the base may be adapted to receive a phonographic record; wherein the spindle engagement portion may engage with the spindle, such that the arm is entirely supported above the base via the spindle; wherein the motor may drive the spindle engagement portion, such that the arm revolves around the base at the spindle; wherein the linear actuator may be configured to move the stylus cartridge along a length of the arm; wherein the vertical solenoid may be configured to allow a stylus of the stylus cartridge to engage with the phonographic record that is loaded on the base. The arm may further comprise one or more sensors; wherein the one or more sensors may be configured to cause the linear actuator to move the stylus cartridge along the length of the arm in order to begin a desired track on the phonographic record. The arm may be configured to automatically determine a speed of the phonographic record. The arm may further comprise a speed switch that allows a user to manually select a revolution speed that conforms with a speed of the phonographic record. The one or more buttons may be a single button that allows a user to control a plurality of operating functions of the arm; wherein the plurality of operating functions of the arm may be selected from the group of operating functions consisting of: turning on; turning off; selecting a specific track; skipping one or more tracks; pausing; and muting. The one or more buttons may be a display touch screen. The display touch screen may allow a user to control a plurality of operating functions of the arm; wherein the plurality of operating functions of the arm may be selected from the group of operating functions consisting of: turning on; turning off; selecting a specific track; skipping one or more tracks; pausing; and muting. The base may further comprise one or more base magnets; wherein the arm may further comprise one or more arm magnets; and wherein the one or more arm magnets and the one or more base magnets may be configured to allow the arm to revolve on the phonographic record in a supported manner but without having any portion of the turntable device other than the stylus touch a top face of the phonographic record. The arm may further comprise a circuit board; wherein the one or more wireless communication devices may be coupled to the circuit board and may be configured to send and receive signals from one or more computing devices. The one or more computing devices may comprise a software application. The software application may be configured to allow a user to control a plurality of operating functions of the arm from the one or more computing devices; wherein the plurality of operating functions of the arm may be selected from the group of operating functions consisting of: turning on; turning off; selecting a specific track; skipping one or more tracks; selecting a record speed; alarm clock function; pausing; and muting. The one or more computing devices may be one or more mobile smartphones. The software application may further comprises a DJ scratching function. The base may further comprise a port and a cable; wherein the port may be configured to connect to a power cord; wherein the cable may be configured to connect to the port and to the spindle; and wherein the base may be configured to provide power to the arm. The power supply of the arm may be a battery; wherein the base may further comprise a port and a cable; wherein the port may be configured to connect to a power cord; wherein the cable may be configured to connect to the port and to the spindle; and wherein the base may be configured to provide power to the arm, such that the battery is recharged. The base may further comprise a port and a cable; wherein the port may be configured to connect to an external device; wherein the cable may be configured to connect to the port and to the spindle; and wherein the base may be configured to allow the arm to send or receive data or sound to the external device. The external device may be selected from the group of external devices consisting of: speakers; headphones; and one or more computing devices. The arm may further comprise one or more ports. The one or more ports may be a micro USB and a micro SD. The base may be constructed of a flexible silicone that substantially prevents the record from slipping when the phonographic record is being played.

Another embodiment of the turntable device may comprise: a base having a pad and a spindle; and an arm, comprising: a housing; one or more buttons; a spindle engagement portion; a stylus cartridge; a power supply; one or more wireless communication devices; a linear actuator; a motor; a vertical solenoid; and one or more support wheels. The base may be adapted to receive a phonographic record. The spindle engagement portion may engage with said spindle. The one or more support wheels may be positioned such that they do not engage with a playing surface of said phonographic record. The motor may drive the spindle engagement portion, such that the arm revolves around said base at the spindle. The linear actuator may be configured to move the stylus cartridge along a length of the arm. The vertical solenoid may be configured to allow a stylus of the stylus cartridge to engage with said phonographic record that is loaded on the base.

It is an object to overcome the limitations of the prior art.

Other features and advantages will become apparent to those skilled in the art from the following detailed description and its accompanying drawings.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

In the following detailed description of various embodiments, numerous specific details are set forth in order to provide a thorough understanding of various aspects of the embodiments. However, these embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

Figure 1:
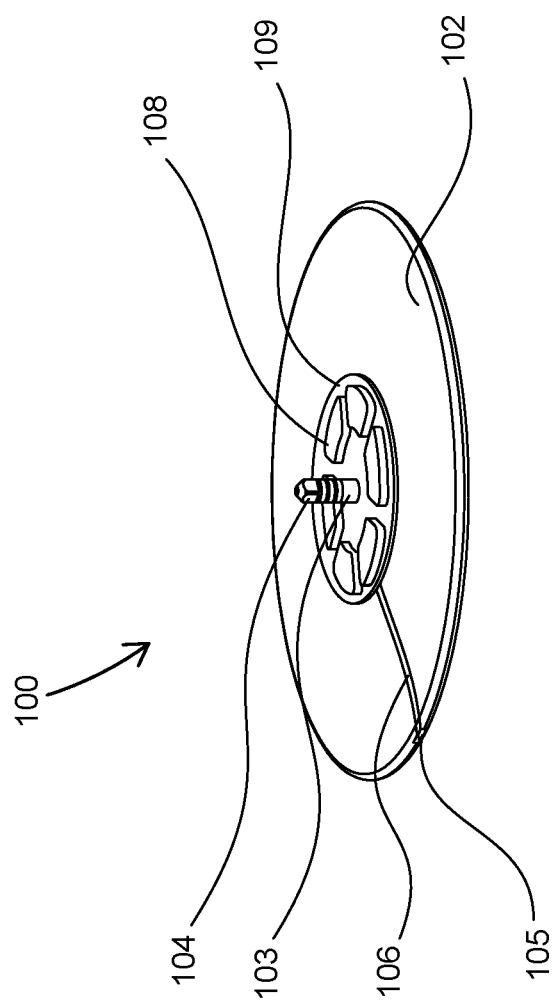
FIG. 1 is an illustration of one embodiment of a base of the turntable device.

FIG. 1 is an illustration of one embodiment of a base of the turntable device. As shown in FIG. 1, the turntable device may comprise a base 100, wherein the base 100 may comprise a thin circular pad 102 and a center spindle 103. Both the base 100 and the pad 102 may be circular or disc-shaped and is preferably configured to engage records, vinyl records, and phonographic discs of various sizes. For example, in one embodiment, the base 100 and/or pad 102 may have a diameter of approximately 7 inches. The base 100 may also comprise a spindle 103 located at the center of the pad 102. The spindle 103 is preferably adapted to engage and pass through the center hole of a record that is placed on the base 100. The spindle 103 may also be adapted to hold and support the arm 200 (shown in FIG. 2) when the arm 200 is engaged with the spindle 103.

In one embodiment, the pad 102 may be constructed of a flexible silicone adapted to substantially prevent the record from slipping or moving when the record is engaged with the base 100. The pad 102, however, may be constructed of any manmade or non-manmade material. In another embodiment, the turntable device may comprise multiple pads, which are disposed or arranged near each other. This will allow the user to change records quickly and efficiently. The spindle 103 may be a metal post.

FIG. 1 also shows that the spindle 103 may comprise an arm engagement key 104. The arm engagement key 104 may be adapted to engage with and secure the arm 200, such that, when the spindle 103 rotates around the base 100, the arm 200 likewise may rotate around the base 100 in a connected and secured manner. The spindle 103 may also include a charging mechanism, so that the arm 200 may charge when connected to the spindle 103. In various embodiments, the spindle 103 may also transmit and receive data and sound. In other embodiments, the post or spindle 103 may be passive, such that the spindle 103 merely serves as a physical support that engages with the arm 200.

In some embodiments, the base 100 comprise an active spindle 103 and a port 105, which may be a micro universal serial bus (USB) port. The port 105 may be configured to couple or connect with a charge cord and/or an A/C power source. The port 105 may also be used to transfer data and/or sound. As shown in FIG. 1, the port 105 may be electronically connected to the spindle 103 via wire or cable 106, which may be embedded within the pad 102. In one embodiment, when the arm 200 (shown in FIG. 2) is coupled or connected to the spindle 103, the user may be able to perform one or more of the following: (1) directly power the arm 200; (2) charge the battery 212; and/or (3) transmit and receive data and/or sound. If the spindle 103 is an active spindle, the user may be capable of charging and controlling the arm 200 when in use without coupling additional wires into the arm 200.

In various embodiments, the pad 102 may different sizes. For instance, in one embodiment, the pad 102 may be approximately 7" in diameter. In another embodiment, the pad 102 may be approximately 12" in diameter, or larger. In other embodiments, the base 100 may be an existing turntable with a dedicated post or spindle. The pad 102 may be larger than 12" in diameter so that supporting wheel(s) may engage with the pad, rather than with an end of a record to be played.

FIG. 1 also shows that the pad 102 may comprise one or more magnets 108, 109. For example, in one embodiment, the pad 102 may comprise magnets 108, 109 that encircle the entire pad 102, as shown with magnet 109. Alternatively, the magnets may be disposed at strategic locations, as shown with magnets 108. The purpose of the magnets 108, 109 may be used to support the arm 200 as the arm 200 spins around and above the base 100. Similarly, the arm 200 may comprise one or more magnets 290 (shown in FIG. 2) that may interact with the magnets 108, 109 of the base 100. This may allow the magnets 108, 109 to smoothly apply a repulsing magnetic force against the arm 200 as the arm 200 spins around the base 100. In this manner, the arm 200 may be supported without contacting or applying pressure to the record being played.

Figure 2:
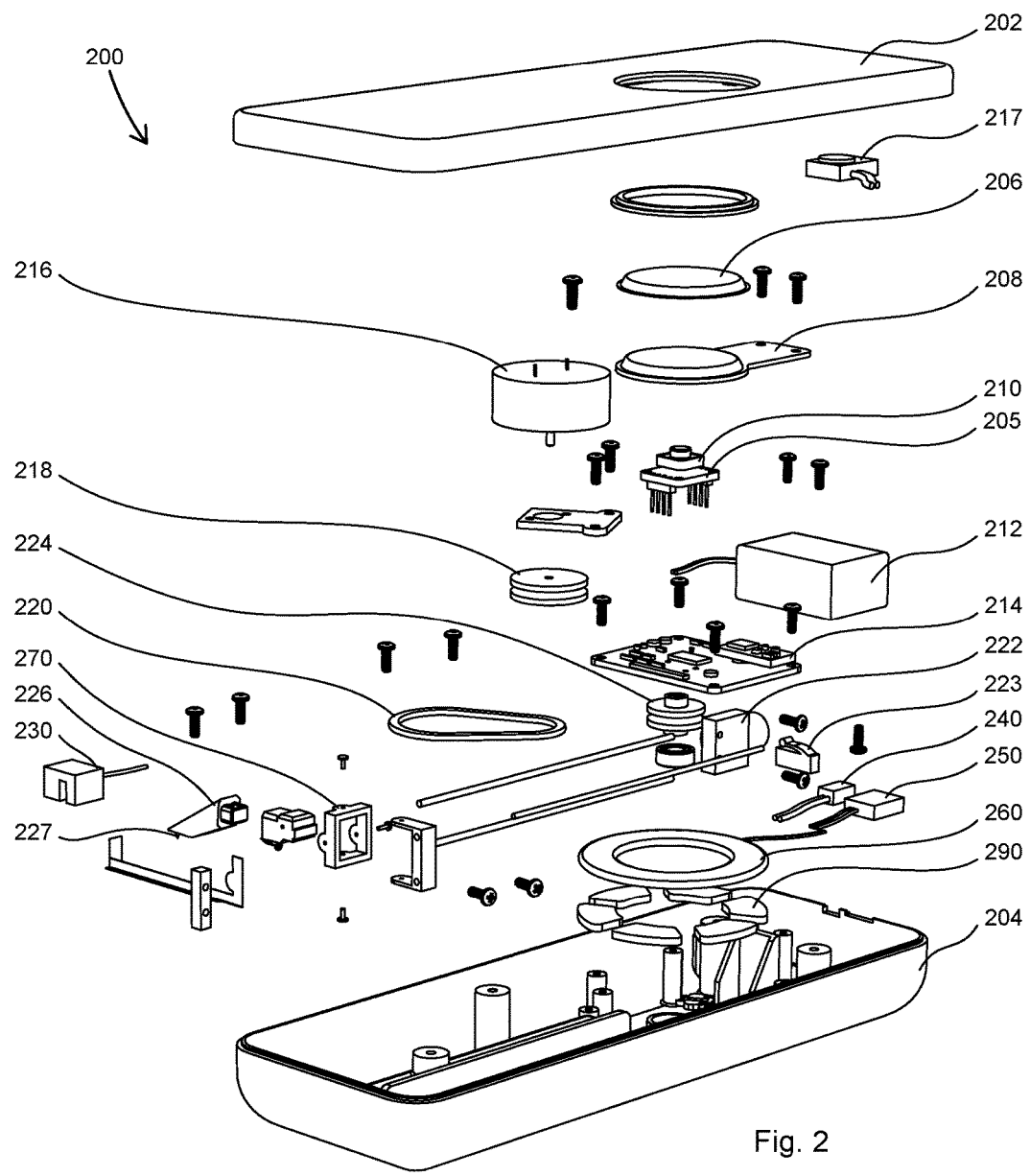
FIG. 2 is an illustration of an exploded view of one embodiment of an arm the turntable device.

FIG. 2 is an illustration of an exploded view of one embodiment of an arm of the turntable device. As shown in FIG. 2, one embodiment of the arm 200 may comprise: a top housing 202, a bottom housing 204, light emitting diode (LED) and switch 205, a master button 206, button cap 208, power switch 210, battery/power supply 212, wireless communication device 214, circuit board 215, motor 216, speed switch 217, pulley 218, belt 220, linear actuator 222, drive pulley 224, vertical solenoid 223, stylus cartridge 226, sensor 230, micro USB port 240, Micro SD 250, charging coil 260, magnet(s) 290, and spindle engagement portion 270, which is also referred to as the "gimbal arm mount".

As shown in FIG. 2, the top housing 202 and bottom housing 204 may engage and fit together to securely hold and protect the inner electronic and mechanical components of the turntable device. The top housing 202 and bottom housing 204 as shown may be generally rectangular, but any shape or design may be used. The top housing 202 include a button or a hole for a button 206 that may serve as the primary user interface with the turntable device. The button 206 may be a one way push button used for activating and/or operating the turntable device. When depressed, the button 206 may activate switch 210 to power the device on/off. The switch 210, which may be electronically coupled to the circuit board 215, may also serve to mute the device, skip a track, or select a specific track. In various embodiments, the arm 200 may be approximately 7-11" long (about 10" is preferred), 2-3" wide, and 0.5 to 3 inches thick.

When assembled, the bottom housing 204 of the arm 200 may include a hole and/or a spindle engagement portion 270 that allows the turntable device to secure onto the spindle 103. Specifically, in one embodiment, the spindle engagement portion 170 may comprise a female portion, and the spindle 103 may comprise a male portion. The female portion of the spindle engagement portion 170 may be adapted to engage and couple with the male portion of the spindle 103 by sliding the female portion onto the male portion vertically. In this manner, the female portion and male portion may be rotationally locked relative to each other in the horizontal plane (i.e., the female portion and male portion cannot rotate relative to each other). Thus, as the spindle 103 rotates, the arm 200 likewise rotates in substantially the same speed and fashion.

When the arm 200 is coupled or connected to the spindle 103, the arm 200 may rotate, usually in a counter-clockwise motion, around the base 100. The motor 216, which drives the arm 200 around the base 100, may be powered by a battery 212 such as a lithium-ion battery. But, any type of battery may be used. Alternatively, the motor 216 and/or arm 200 may be powered by alternating current via an A/C adapter.

Preferably, the spindle 103 is capable of supporting the weight of the arm 200 without having the arm 200 (or a portion thereof) contacting or touching the base or record being played. Accordingly, the weight of the arm 200 is preferably, equally distributed around the hole of the bottom housing 204 of the arm 200 and/or the spindle engagement portion 270. In this manner, the arm 200 may be easily supported by the spindle 103. As discussed above, in one embodiment, the arm 200 may comprise one or more magnets 290 that magnetically interact with the magnets 108, 109 of the base 100. This may allow the arm 200 to be further supported without any other contact point other than the spindle 103.

In other embodiments, the arm 200 may also comprise one or more support wheels adapted to engage within the inner circle of the record (e.g., inside label of the record).

Furthermore, an embodiment of the button 206 may be configured to be pushed normally without the actuating action affecting the playback of the record by the arm 200. In other words, in the event a record is being played and the user pushes the button 206, the record will not be damaged and the playback will not be disturbed. Various suspension mechanisms and internal component mounting hardware may also allow the button 206 to be operated without having a significant effect on the housings 202, 204. In other embodiments of the turntable device, the addition of swiveling components and location of button placements are also contemplated to help minimize the effect on the housings 202, 204 when the button 206 is operated.

FIG. 2 also shows that the arm 200 may comprise a linear actuator 222 adapted to move the stylus cartridge 226 along the length of the arm 200. This may allow the stylus 227 to be placed at the appropriate location to play the desired track of the album. Conversely, the stylus cartridge 226 may also be free to move inwardly in a linearly manner within the arm 200 as the record is played. The stylus cartridge 226 may be suspended with mounting hardware, such that external bumps or vibrations will not necessarily disturb the playback of the record. This is also referred to as a head tracking system. In one embodiment, the linear actuator 222 may be a system utilizing a solenoid linear motor that provides strokes with constant force over a short limited distance. In another embodiment, the linear actuator 222 may lack a solenoid linear motor, but may utilize electromagnets. Still, in another embodiment, the linear actuator 222 may utilize a rotational motor with a screw system. The arm 200 may also comprise a vertical solenoid, which may be coupled to the arm 200 or integrated into the arm 200. The vertical solenoid may also be configured to move the arm 200 up and down by pivoting the arm 200 vertically with respect to the linear actuator 222. This movement may allow the stylus cartridge 226 attached to the arm 200 to move onto the record.

In one embodiment of the turntable device, the arm 200 may be configured to automatically determine what speed the record is to be played by utilizing one or more sensors or through data sent to the circuit board 215. Based on the data and/or sensors, the arm 200 may then automatically set the speed of the motor 216 accordingly. However, in a preferred embodiment, the arm 200 may include a speed switch 217 located on any side of the arm (e.g., a bottom side of the bottom housing 204). The speed switch 217 may allow the user to set the speed of the motor 216 such that the arm 200 rotates around the record at an appropriate speed. In one embodiment, the speed switch 217 may be a capacitive speed switch that allows the user to set the speed between two or three different speeds. Given that most records are played using one of four different speeds: 16⅔ revolutions per minute (rpm), 33⅓ rpm, 45 rpm, and 78 rpm, it is rare that a record is played other than 33⅓ or 45 rpms. Thus, most of the present turntable devices may be designed with a switch to select one of these two speeds. However, variable speed motors are advanced so that any of the four speeds may be programmed on the circuit board 215, which may be electrically coupled to the motor 216. If the arm 200 utilizes only a two or three speed switch, the speed may be overruled or determined by a programmed connected computing device. In this manner any speed may be programmed, selected, or unlocked.

In one embodiment, the arm 200 may be coupled to or connected to a cord charger though the micro USB port 240 in order to recharge the battery 212. Preferably, the user may communicate, power/charge, or otherwise control the turntable device: (1) through the Micro SD 250 (a secure digital female port); (2) through an active spindle 103 connected to a spindle engagement portion 270; wireless charging through the charging coil 260; through micro USB port 240;

and/or wireless device(s) 214. One embodiment of the arm 200 may also couple to or connect with a dedicated remote control through infrared, Bluetooth®, or some other wireless system.

In one embodiment, the arm 200 may comprise one or more sensors. For example, the arm 200 may comprise sensor 230, which may be a laser, infrared, or an optical sensor that is coupled to or near to stylus cartridge 226. Sensor 230 may, based on the groove pattern of the record to be played, be adapted to locate the start of each track on the record. This allows the user to select a track to play, and the arm 200 may move the cartridge 226 to the correct position on the record, lower the stylus 227 to the record, and then start to revolve around the stationary record, such that the record is played. The cartridge 226 and stylus 227 may be interchangeable to allow for upgrades.

In another embodiment, the arm 200 may be coupled to a record cleaning device. The record cleaning device may be powered through the arm 200 via micro USB port 240.

In another embodiment, the arm 200 may comprise one or more wireless communication devices 214, such as a transmitter, receiver, and/or a transceiver that may operate on any wireless platform, including, but not limited to: Wi-Fi, infrared, LTE, LTE Advanced, Bluetooth® (short-wavelength UHF radio waves) and/or Miracast®. Because the arm can communicate wirelessly, the turntable device can be programmed or controlled by an external computing device. In one embodiment, the external computing device may be a mobile smartphone utilizing a software application (the "App") that allows the smartphone to communicate with, receive sound from, and/or control the turntable device.

The wireless device 214 may allow the arm 200 to auto pair with speakers, headphones, or a computing device, in order to transmit the playback sound of the record being played. In one embodiment, the arm 200 may wirelessly pair via a Bluetooth® connection.

The App preferably allows the external computing device to function as a remote control to power on, turn off, mute, select a track, and/or skip tracks on the record. In another embodiment, the App may also cause the turntable device to function as a clock or an alarm clock. In this embodiment, the base 100 may comprise clock-based number markings, and the arm 200 may couple to the base 100. The arm 200 may also rotate in a clockwise manner and face the corresponding clock-based number marking, based on the current time, similar to a clock. The alarm clock function, for instance, may allow the App, at a designated time, to turn on and play a preloaded record. The App may also allow the computing device to digitally record the playback of a record and then share those digital recordings via various electronic means such as the cloud, email, or social media.

In another embodiment, the App may also cause the arm to move in a back and forth manner, allowing the user to create a DJ scratching effect. However, in a preferred embodiment, the digital scratching is a digital manipulation, mimic scratching, or effect that does not move the needle, but instead manipulates a digital playback with a virtual scratching effect. In one embodiment, this "scratching" may be performed digitally through audio special effects and may be performed on a pre-recording of a song. The stylus would also preferably not touch the record. Thus, the App preferably mimics the scratching movement and may provide a visual effect that correlates with the audio output. A dancing in sync feature, wherein the arm moves in synchronicity with or without lighting, may also be a feature.

The App may also comprise a display that lists each of the tracks on the side of the record currently being played. By selecting one of the tracks, the arm may automatically move to that track on the record in order to play that track. In various embodiments, the App may also display the original album graphics, text, and cover art as well as additional information, including band biographies, and/or links to information about the songs and band on the record being played.

The turntable device may also utilize stickers readable by the turntable device. Specifically, the stickers may be attached to the albums, and the turntable device may read that sticker to automatically determine that album's speed. Sensor 230, whether laser or optical, for instance, may read the sticker in order to determine the speed of the record.

In one embodiment, the method of playing a record using the turntable device may comprise the steps of: (1) placing the record on the base; (2) setting by the user or determining by the arm 200 a speed for record playback; (3) coupling the arm to the spindle of the base; (4) powering on the arm 200; and (5) playing the record. In one embodiment, a first track may be selected by pushing button 206 the same number of times as the desired track. The arm 200 may also be turned off by holding the button 206 down for a set duration of time, such as for three seconds. In another embodiment, the button 206 may be pushed quickly to pause or mute the record playback. Alternatively, these operation functions may be controlled remotely via the App.

FIG. 2 also shows that the button 206 may be illuminated via an LED light that may be a ring surrounding the button 206. The ring may be illuminated in various colors to inform the user as to the status of the arm 200. In one embodiment, the button 206 may either be a button or an interactive LCD touch screen.

Figure 3:
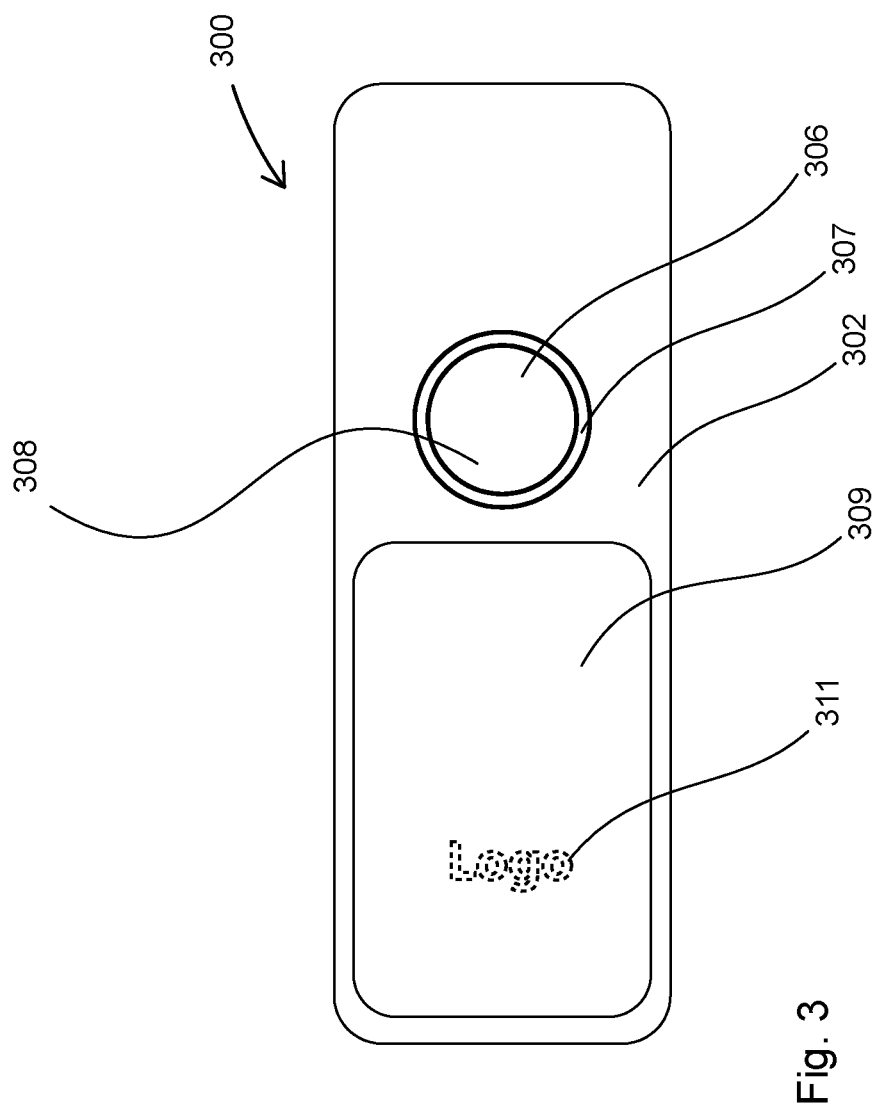
FIG. 3 is an illustration of a top view of one embodiment of an arm of the turntable device.

FIG. 3 is an illustration of a top view of one embodiment of an arm of the turntable device. FIG. 3 shows that the top housing 302 or top portion of the arm 300 may comprise: a button 306, a button ring 307, a graphic or skin 309, and a logo 311. FIG. 3 shows that in addition to, or instead of, being merely a push button that activates an internal switch, the button 306 may be a display touch screen 308. The display touch screen 308 may be a LCD screen with touch sensitivity. In this manner, the user is able to operate the turntable device through a touch screen interface. The display touch screen 308 may be used for multiple purposes for multiple functions. The display touch screen 308, for instance, may be used as an ON/OFF switch. The display touch screen 308 may also be used for selecting the speed of the arm 200 as well as displaying the actual speed (e.g., 45 rpm). Preferably, the display touch screen 308 will provide more feedback by displaying additional information and including additional interface control (e.g., multiple buttons).

Figure 4:
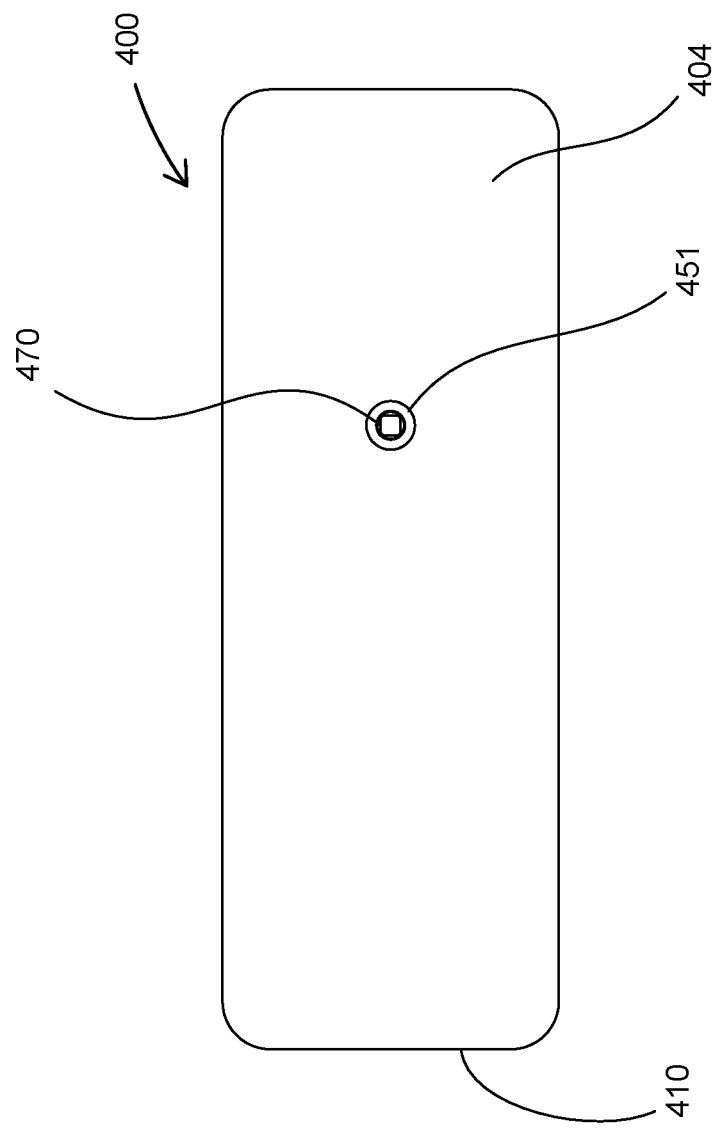
FIG. 4 is an illustration of a bottom view of one embodiment of an arm of the turntable device.

FIG. 4 is an illustration of a bottom view of one embodiment of an arm of the turntable device. As shown in FIG. 4, the bottom housing 404 or bottom portion of the arm 400 may comprise a spindle engagement portion 470. The spindle engagement portion 470 may be part of or integrated with the housing 404. Alternatively, the spindle engagement portion 470 may be an internal component that is accessed through a hole or aperture 451. Preferably, the distance between the spindle engagement portion 470 and the distal edge 410 of the housing 404 is long enough to allow the arm 400 to fully engage with a 10" diameter record. Moreover, the spindle engagement portion 470 is preferably located at a balanced point between the two edges, such that the arm can rest and be entirely supported by the spindle 103.

Figure 5:
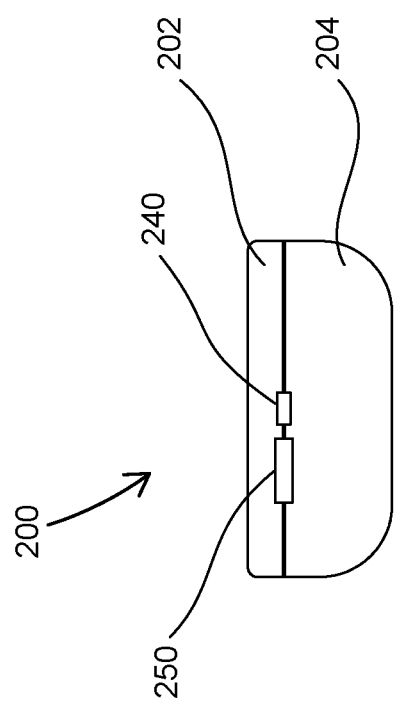
FIG. 5 is an illustration of an end view of one embodiment of an arm of the turntable device.

FIG. 5 is an illustration of an end view of one embodiment of an arm of the turntable device. As shown in FIG. 5, one embodiment of the arm 200 may comprise a micro USB port 240 and micro SD slot 250. Although two ports are shown, additional ports or slots may be included and may utilize other types of protocols such as USB, pin, data, or charging ports.

Figure 6:
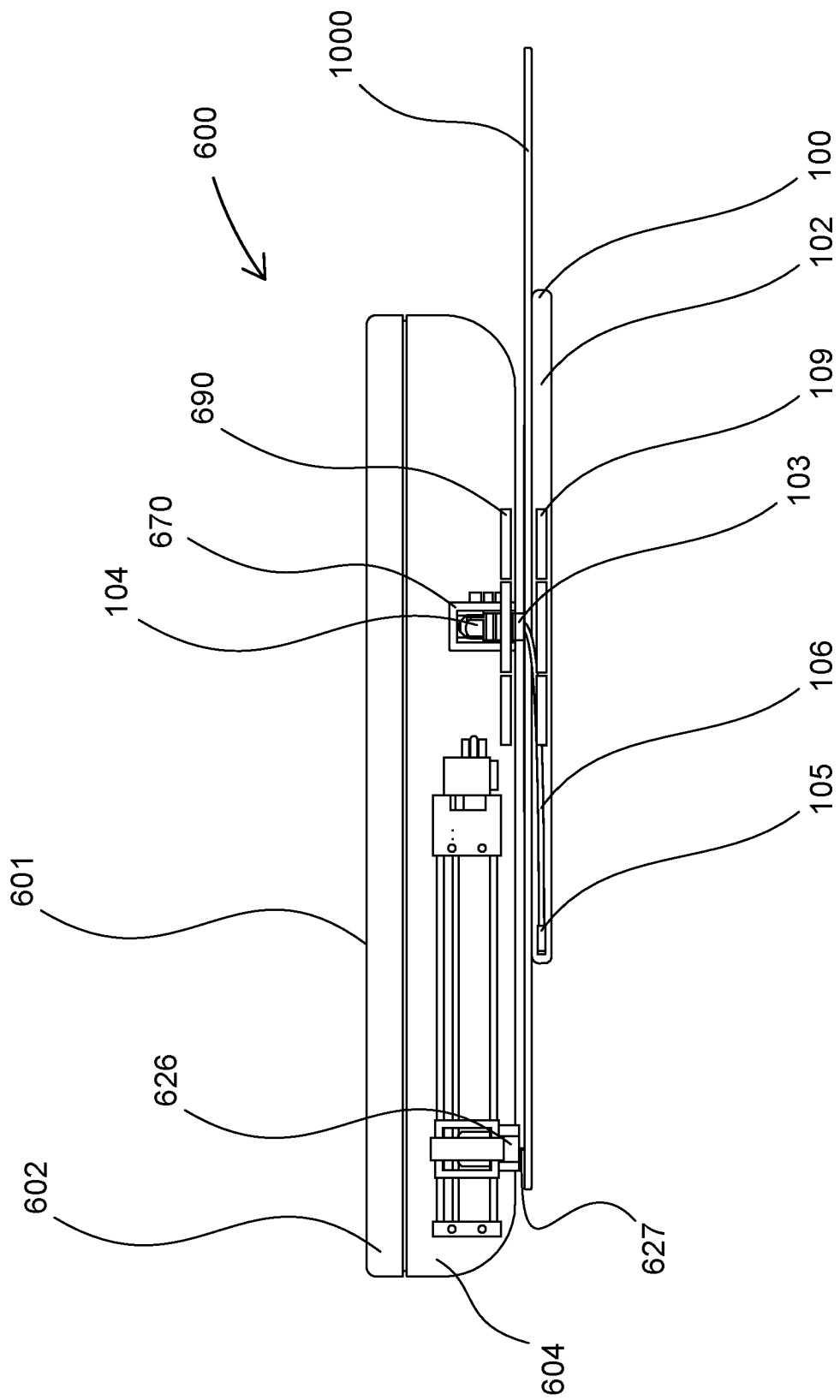
FIG. 6 is an illustration of a side cross-section view of one embodiment of the turntable device.

FIG. 6 is an illustration of a side cross-section view of one embodiment of the turntable device. FIG. 6 shows that one embodiment of the turntable device 600 may comprise a base 100 and an arm 601. The base 100 may comprise a pad 102, a spindle 103, an arm engagement key 104, a magnet 109, and a port 105. FIG. 6 also shows that a micro USB cord may be plugged into port 105 to transfer data and/or provide power. As shown in FIG. 6, the spindle 103 may be an active spindle adapted to be engaged by both a record 1000 and a spindle engagement portion 670 of the arm 601. Once engaged, power and information may be transmitted from the port 105 to the spindle 103 via cable/wire 106.

FIG. 6 also shows how the magnets 109 may be embedded in the pad 102 to provide a counterforce to magnets 690 in the arm 601. Arm 601 is shown with a top housing 602 and a bottom housing 604. FIG. 6 also shows how arm 601 preferably extends beyond the edge of the record 1000. In this manner, cartridge 626, via stylus 627, is capable to engage the entire radius of record 1000, which is preferably a grooved vinyl record or an analog equivalent thereof.

Figure 7:
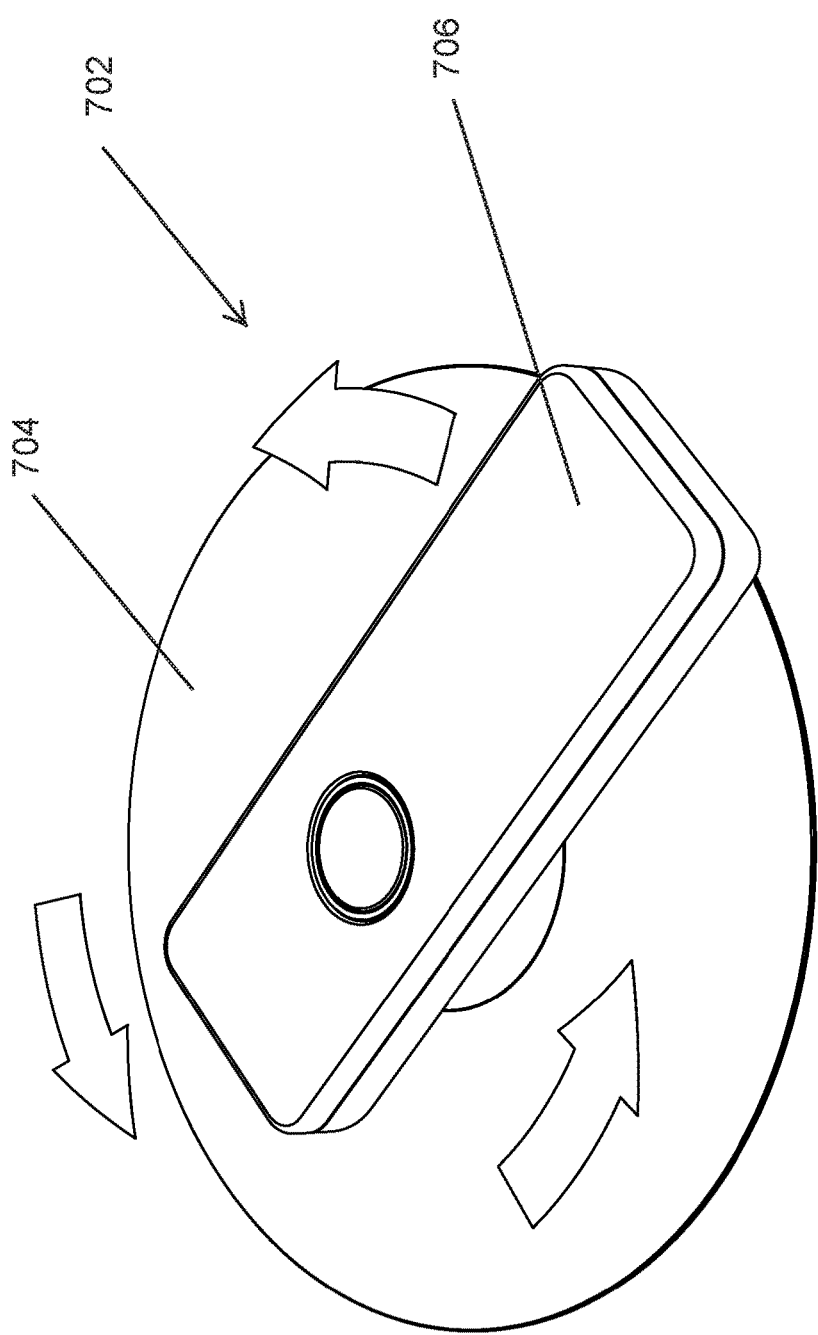
FIG. 7 is an illustration of a top perspective view of one embodiment of an arm of the turntable device.

FIG. 7 is an illustration of a top perspective view of one embodiment of an arm of the turntable device. FIG. 7 shows how the arm 706 preferably may turn in a counterclockwise manner 702 on record 704.

Figure 8:
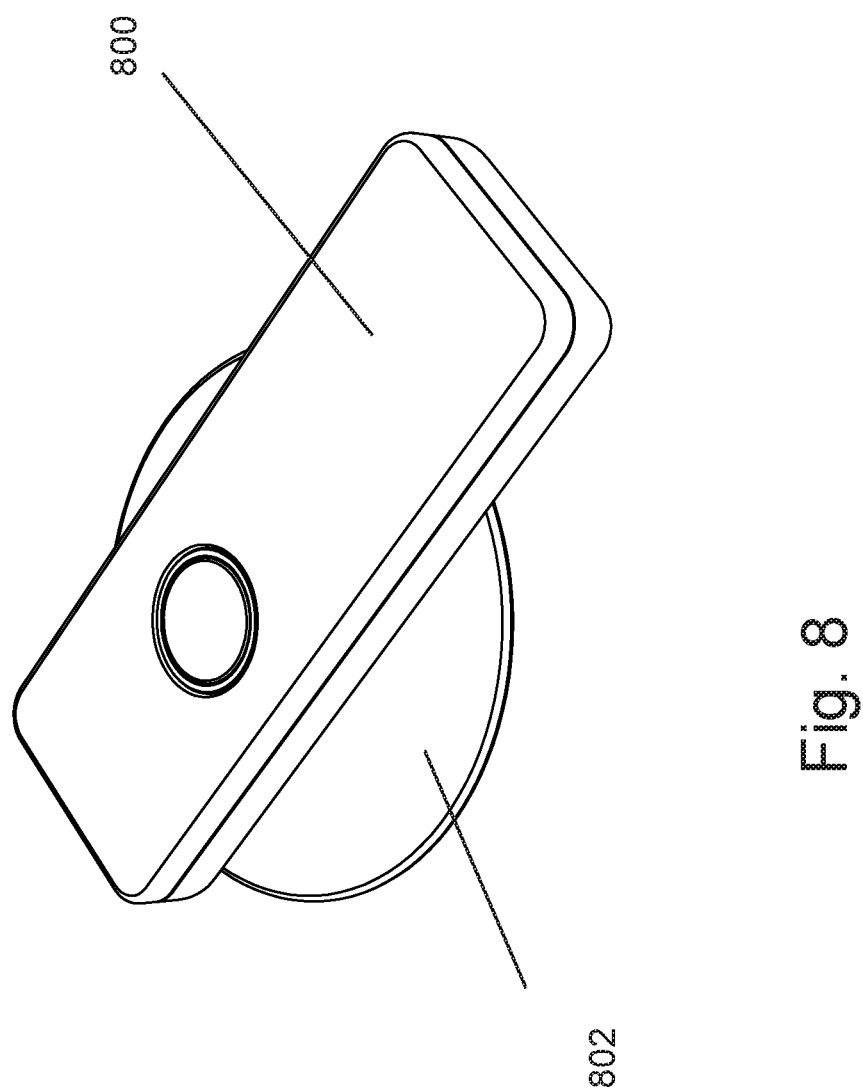
FIG. 8 is an illustration of a top perspective view of one embodiment of the turntable device.

FIG. 8 is an illustration of a top perspective view of one embodiment of the turntable device. FIG. 8 shows arm 800 engaged with base 802.

Figure 9:
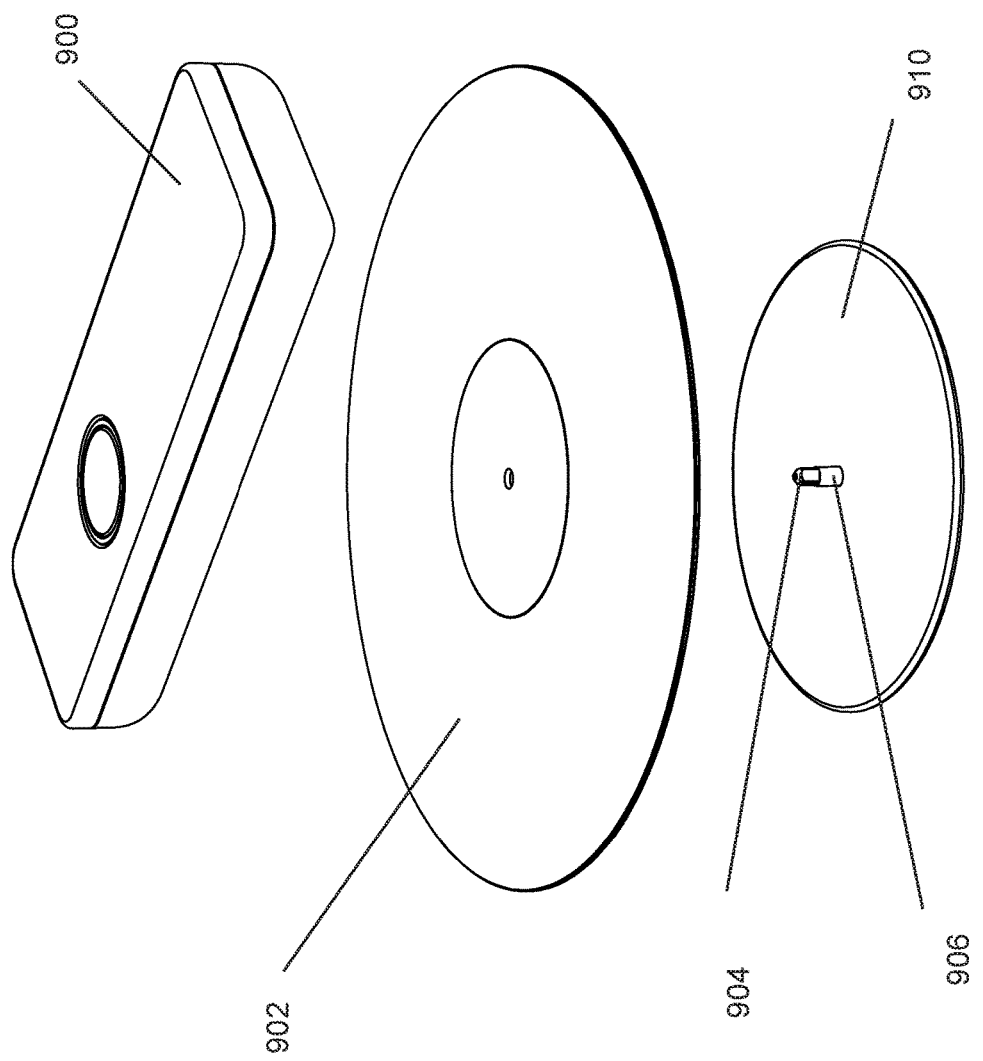
FIG. 9 is an illustration of an exploded view of one embodiment of the turntable device.

FIG. 9 is an illustration of an exploded view of one embodiment of the turntable device. FIG. 9 shows that base 910 may have a spindle 906, which is configured to go through a center hole of record 902 and then engage with arm 900. FIG. 9 shows that spindle 906 may have an arm engagement key 904.

Figure 10:
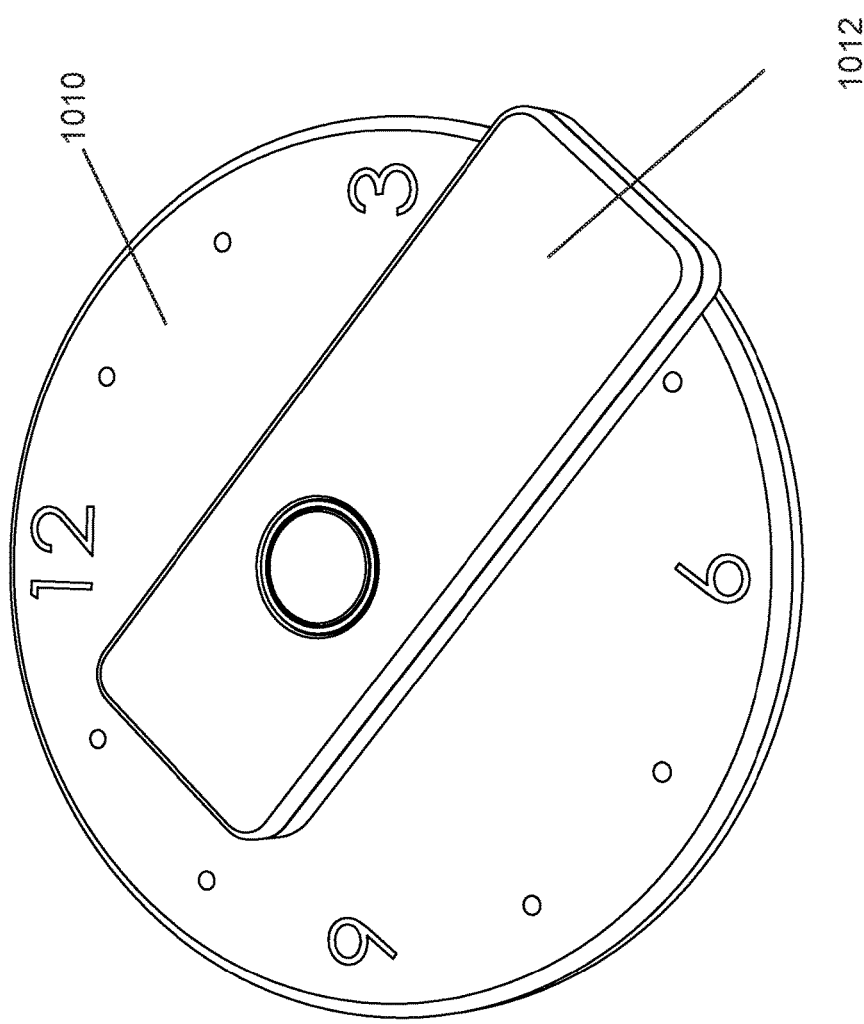
FIG. 10 is an illustration of a top perspective view of one embodiment of an arm of the turntable device, wherein the base is an analog clock.

FIG. 10 is an illustration of a top perspective view of one embodiment of an arm of the turntable device, wherein the base is an analog clock. FIG. 10 shows that arm 1012 may be programmed to function as the big hand of an analog clock on base 1010, which may have a top portion or skin that depicts an analog clock face.

Figure 11:
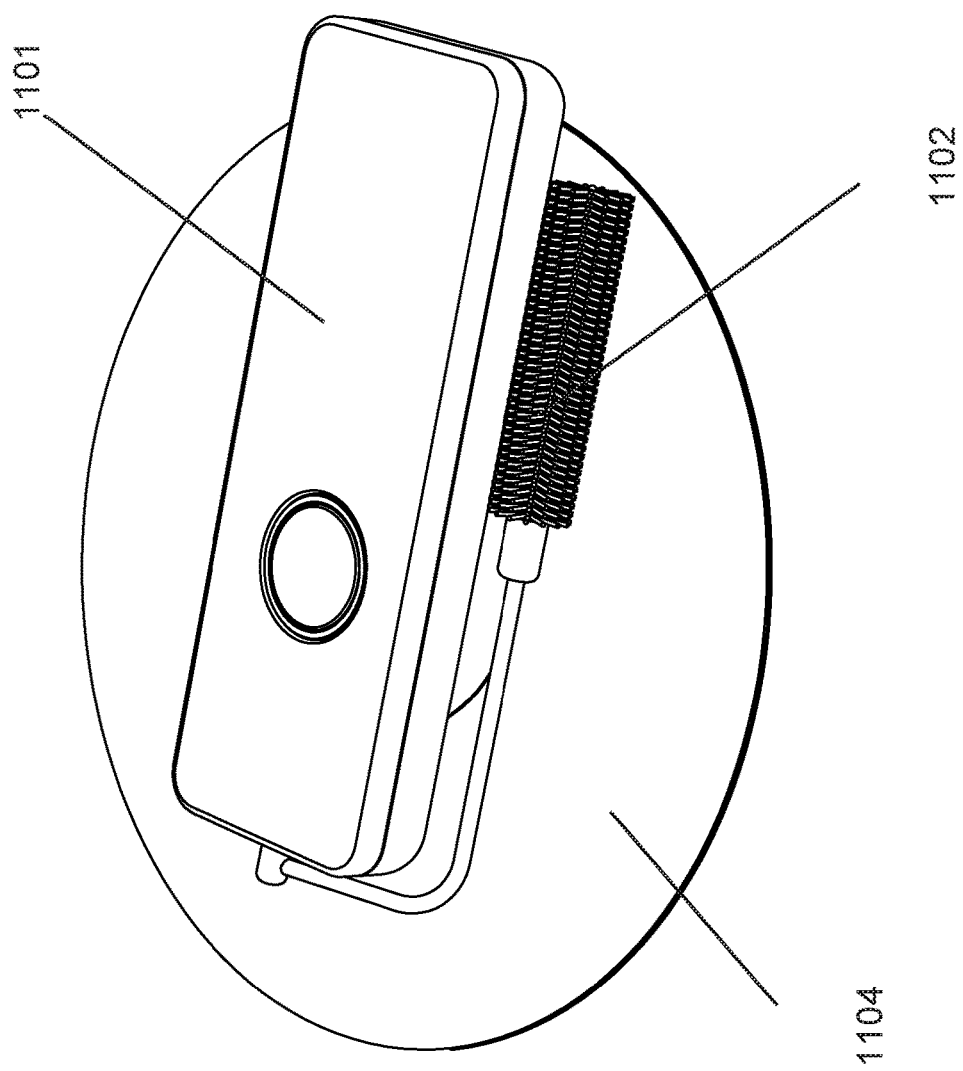
FIG. 11 is an illustration of a top perspective view of one embodiment of the turntable device with a record cleaner.

FIG. 11 is an illustration of a top perspective view of one embodiment of the turntable device with a record cleaner. FIG. 11 shows that arm 1101 may have a cleaning attachment 1102 that may be configured to clean record 1104 as the arm 1101 spins around.

Figure 12:
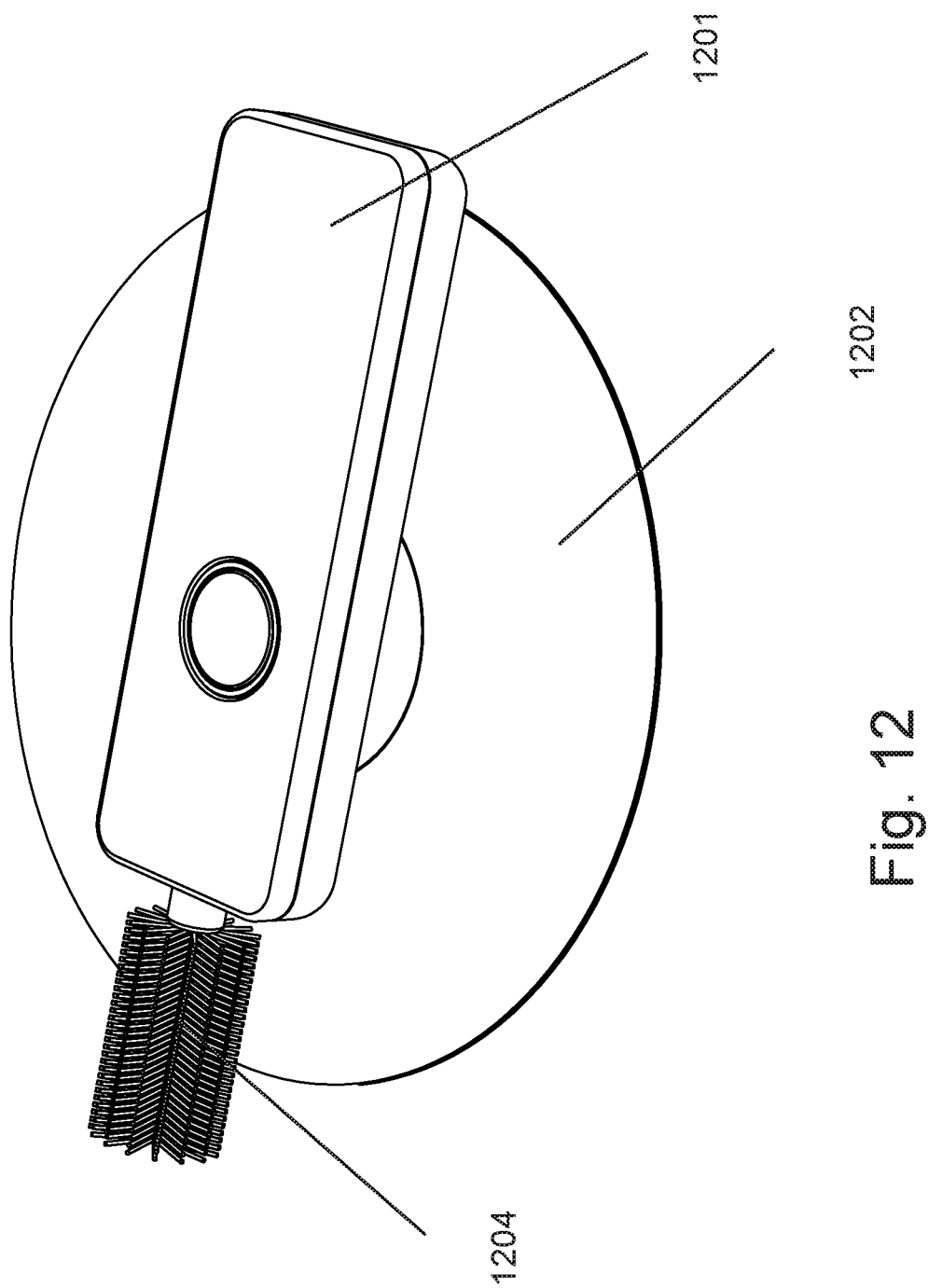
FIG. 12 is an illustration of a top perspective view of another embodiment of the turntable device with a record cleaner.

FIG. 12 is an illustration of a top perspective view of another embodiment of the turntable device with a record cleaner. FIG. 12 shows that the arm 1201 may have cleaning attachment 1204 that may be configured to clean record 1202.

The cleaning attachment may be active and powered by the Micro-USB port in the arm, or may be passive and unpowered.

Figure 13:
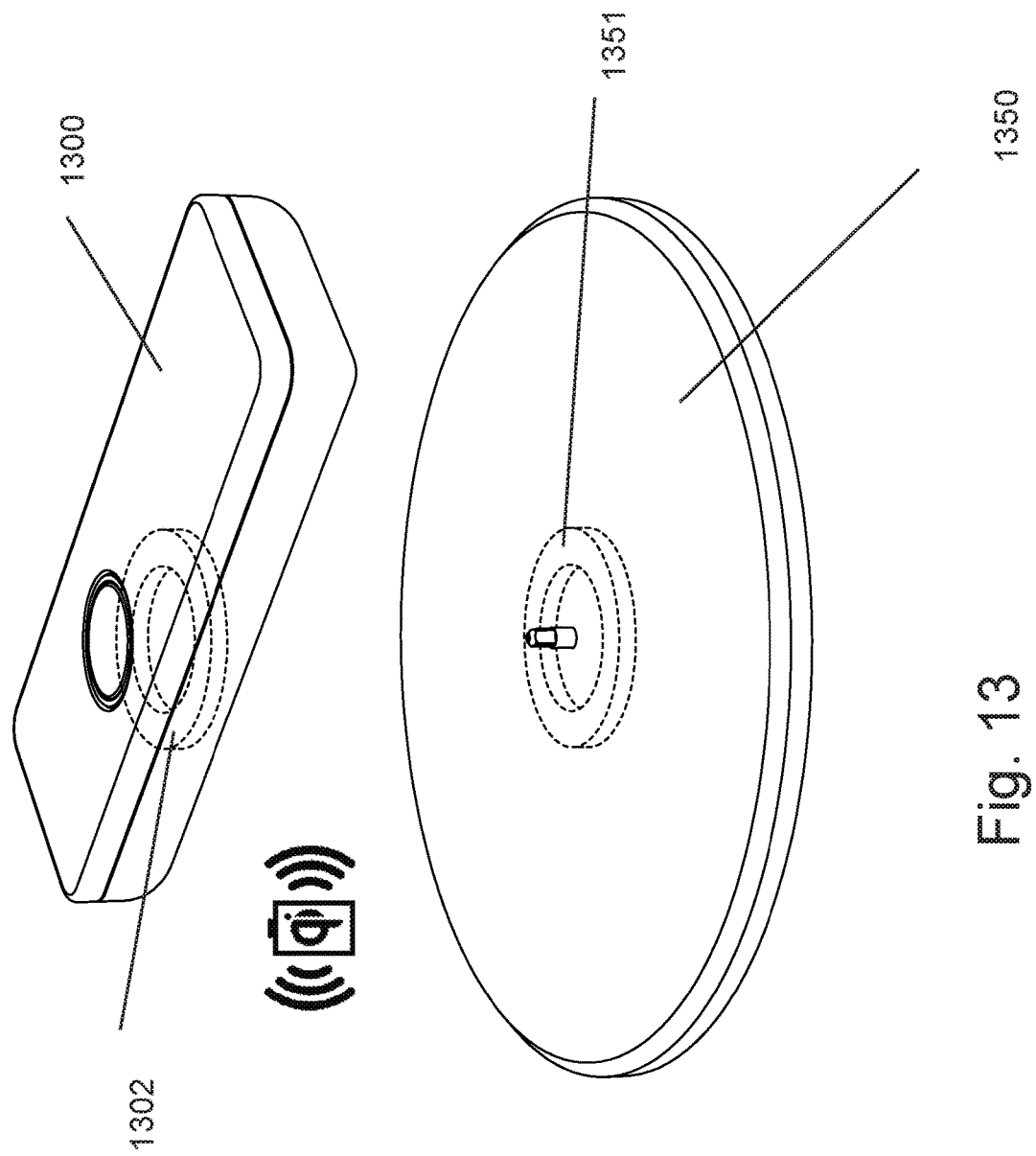
FIG. 13 is an illustration of a top perspective view of one embodiment of the turntable device with a cordless charging ring.

FIG. 13 is an illustration of a top perspective view of one embodiment of the turntable device with a cordless charging ring. In one embodiment the base 1350 may have a Qi wireless charging plate 1351, which, as shown, may be placed in the center of the base 1350 so as to be located directly across from the charge coil 1302 of the arm 1300. The base 1350 may be connected to a power source through a charge cord, which may then wirelessly provide power to the arm 1300 or charge a battery in arm 1300.

Figure 14:
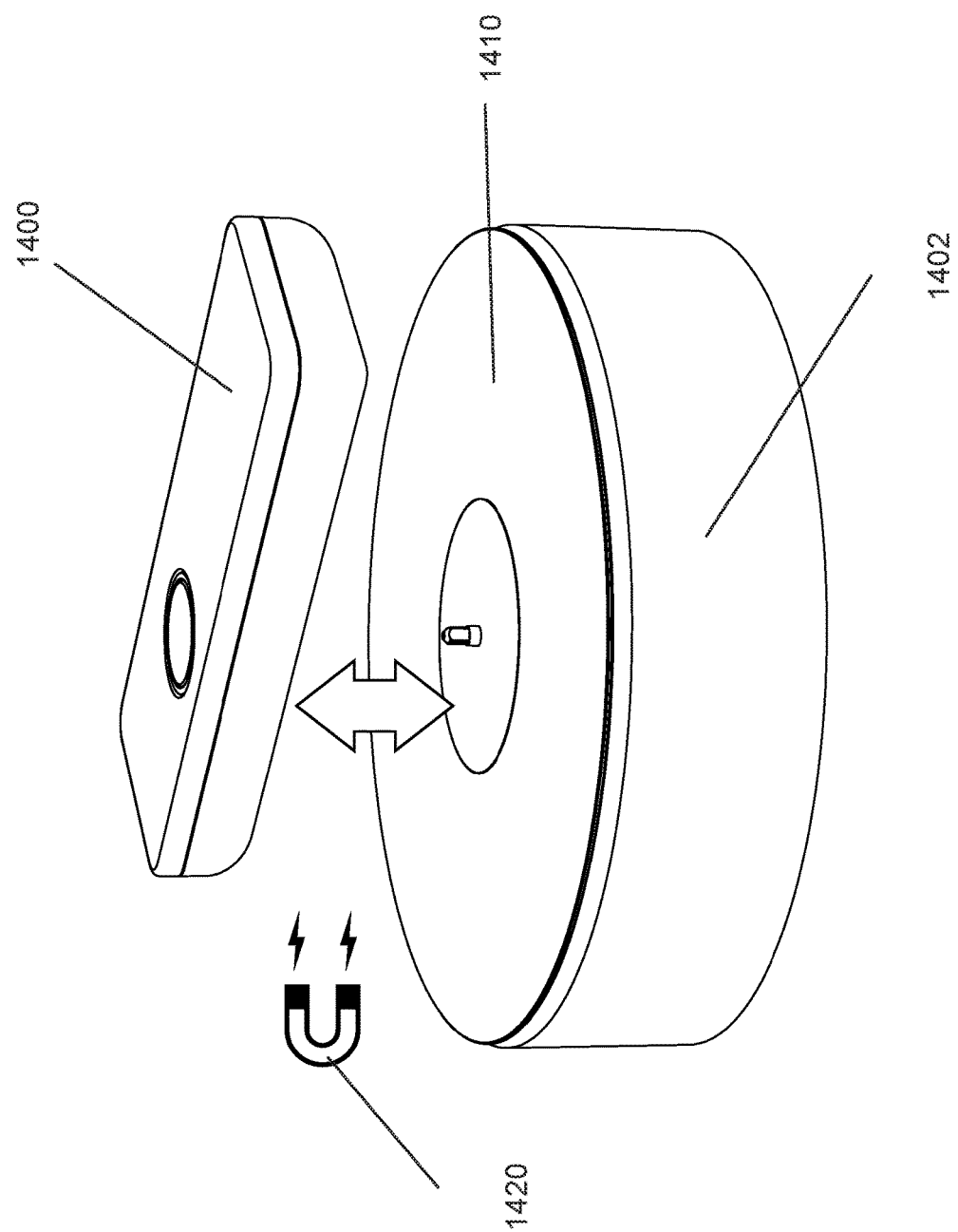
FIG. 14 is an illustration of a top perspective view of one embodiment of the turntable device and shows the use of magnets.

FIG. 14 is an illustration of a top perspective view of one embodiment of the turntable device and shows the use of magnets. FIG. 14 shows that magnets may be used to repel 1420 the arm 1400 from base 1402, such that the only part of the arm 1400 that touches record 1410 is the cartridge stylus.

Figure 15:
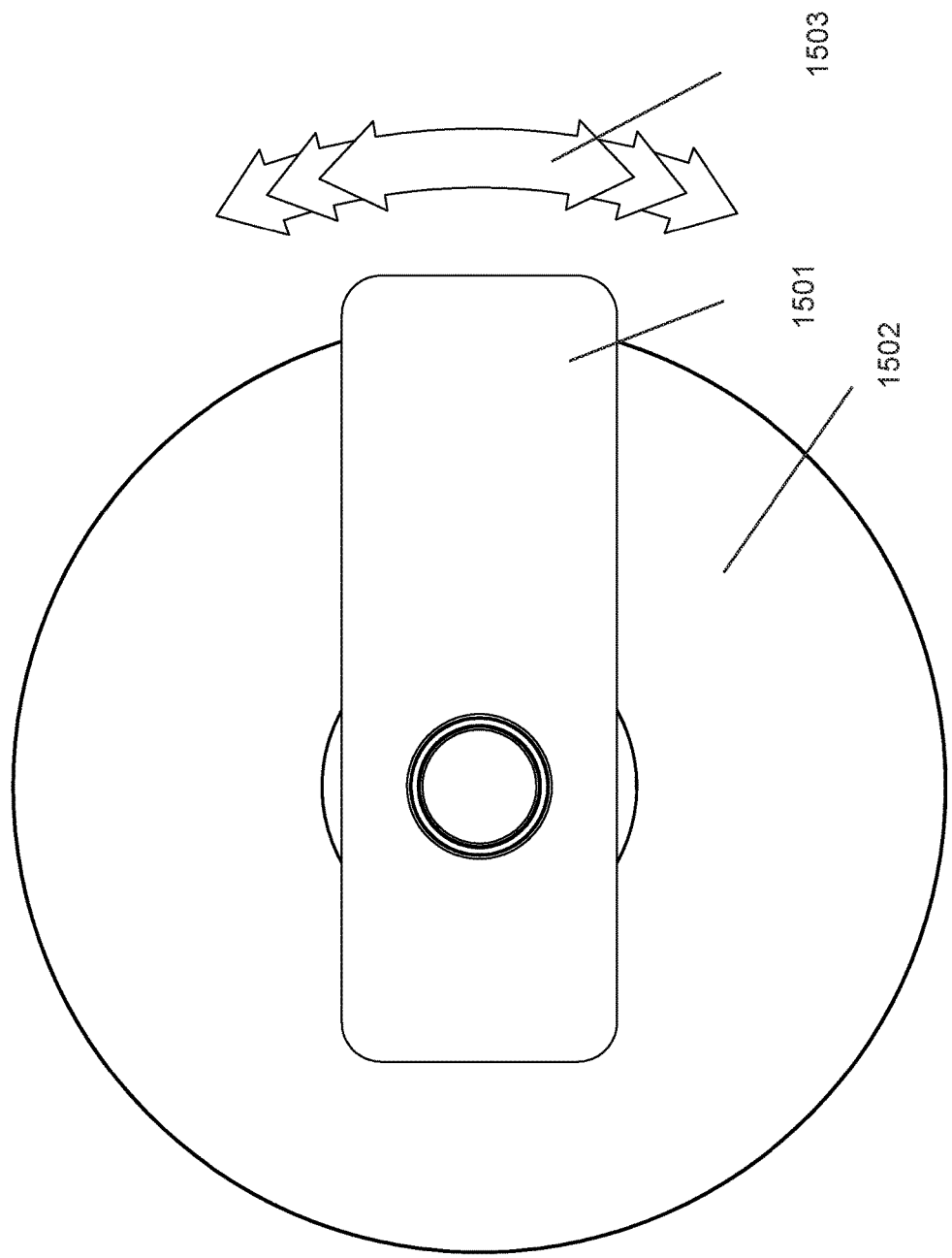
FIG. 15 is an illustration of a top view of one embodiment of the turntable device and shows the scratching motion.

FIG. 15 is an illustration of a top view of one embodiment of the turntable device and shows the scratching motion. FIG. 15 shows that arm 1501 may be programmed to move in a scratching motion 1503 on record 1502.

Figure 16:
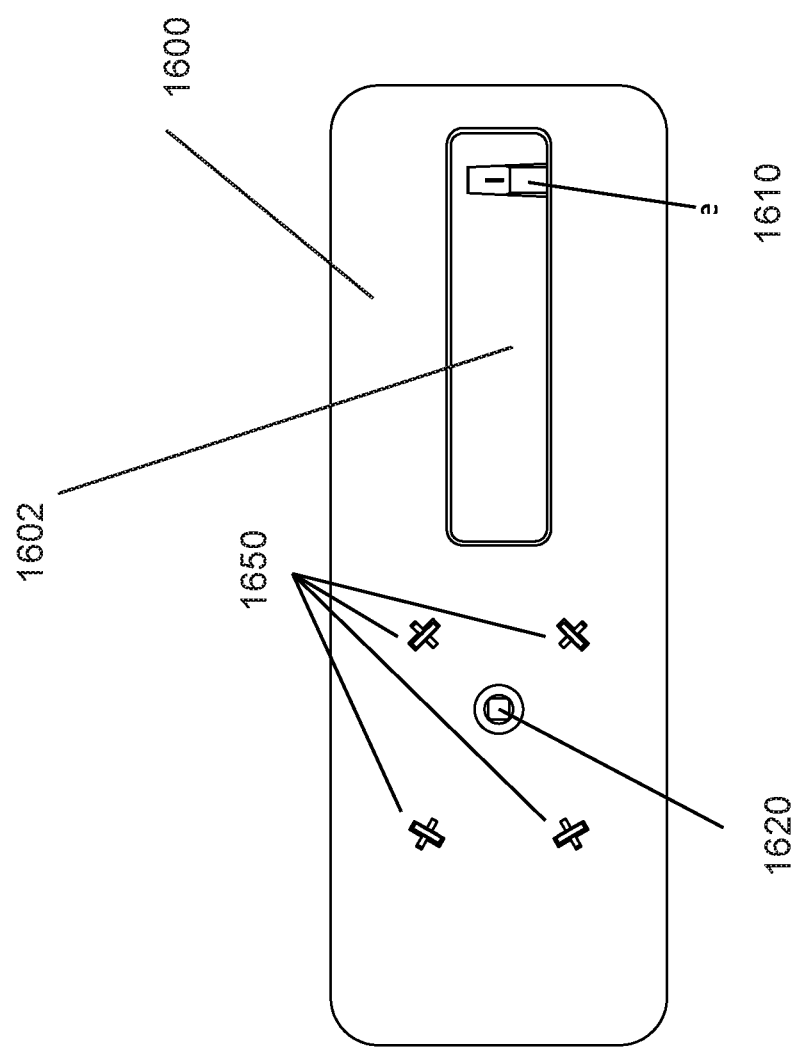
FIG. 16 is an illustration of a bottom view of one embodiment of an arm of the turntable device and shows support wheels and the cartridge.

FIG. 16 is an illustration of a bottom view of one embodiment of an arm of the turntable device and shows support wheels and the cartridge. In one embodiment the arm 1600 may have support wheels 1650. FIG. 16 shows that arm 1600 may have a linear portion 1602 that runs along a length of the bottom of arm 1600. This allows the linear actuator to move cartridge 1610 along the radius of records to be played. The support wheels 1650, as shown preferably engage with the center label of a record. In this manner, the support wheels do not engage with the playing surface of the record.

Figure 17:
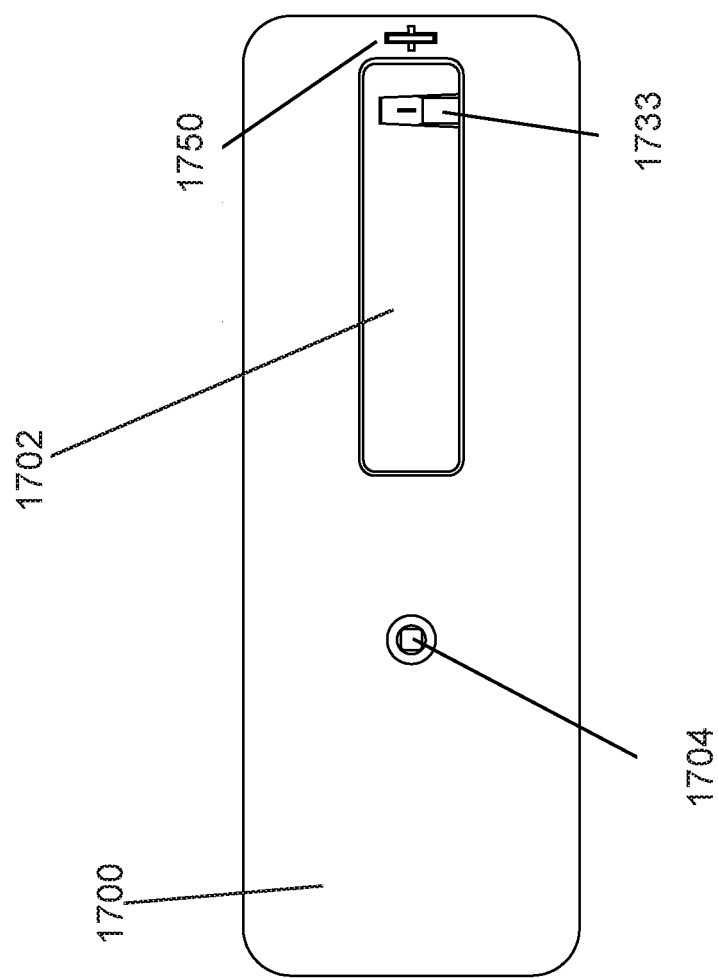
FIG. 17 is an illustration of a bottom view of another embodiment of an arm of the turntable device and shows a support wheel and the cartridge.

FIG. 17 is an illustration of a bottom view of another embodiment of an arm of the turntable device and shows a support wheel and the cartridge. FIG. 17 shows that arm 1700 may have support wheel 1750, linear portion 1702, cartridge 1733, and spindle engagement portion 1704. FIG. 17 shows that the support wheel 1750 is positioned so that it engages the end of the record, which is not part of the playing surface of the record.

Figure 18:
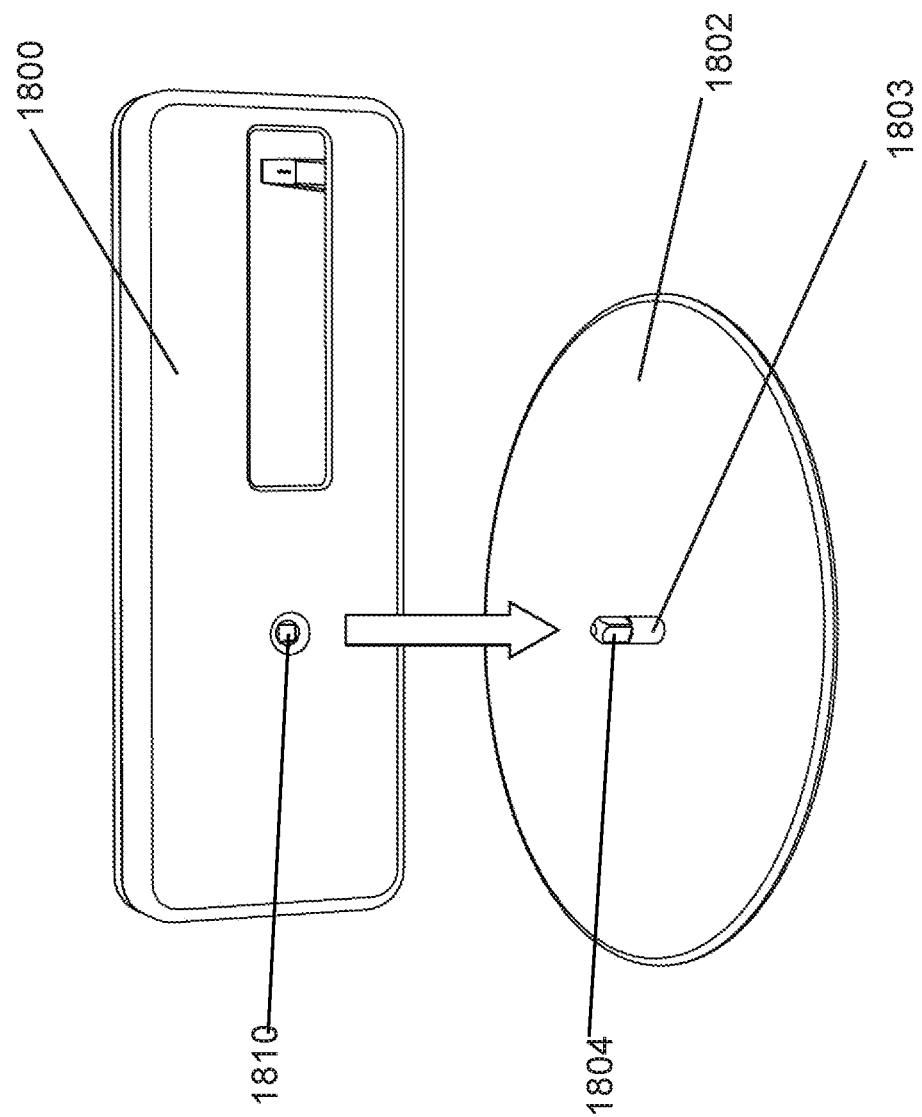
FIG. 18 is an illustration of an exploded view of one embodiment of the turntable device.

FIG. 18 is an illustration of an exploded view of one embodiment of the turntable device. FIG. 18 shows how the arm engagement key 1804 of spindle 1803 of base 1802 may be configured to matingly engage with the spindle engagement portion 1810 of arm 1800. The two parts preferably interlock, as shown.

Figure 19:
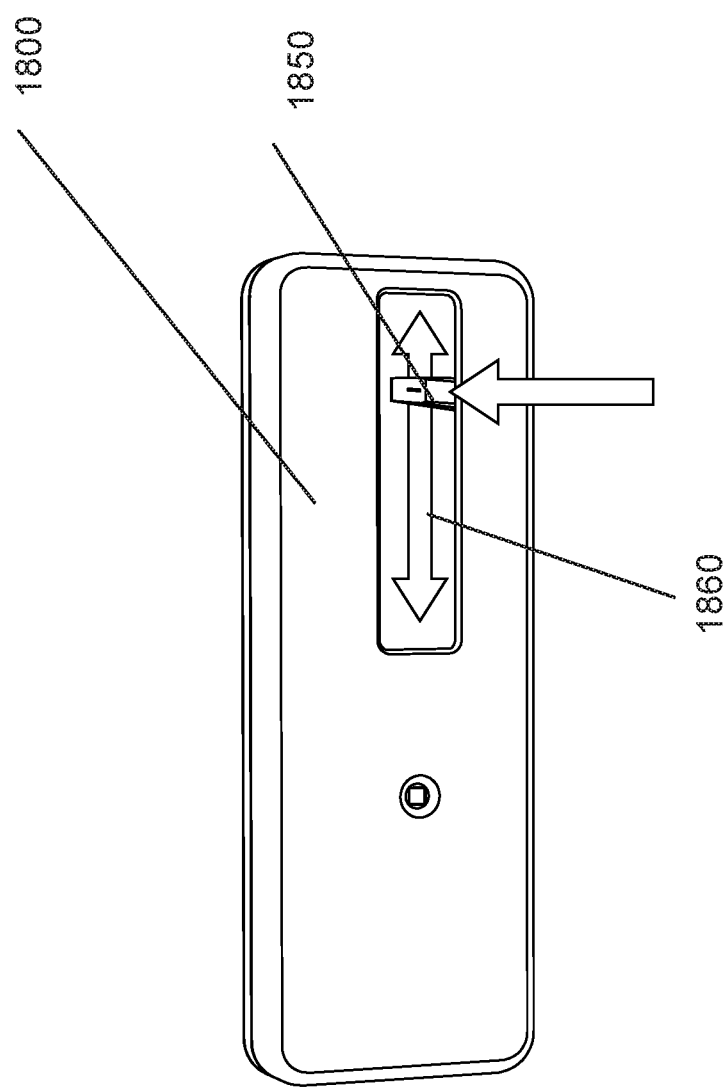
FIG. 19 is an illustration of a bottom perspective view of one embodiment of an arm of the turntable device and shows the cartridge.

FIG. 19 is an illustration of a bottom perspective view of one embodiment of an arm of the turntable device and shows the cartridge. FIG. 19 shows that arm 1800 may have a linear portion 1860 that allows the linear actuator to move the cartridge 1850 along a radius of a record to be played. The Linear portion 1860 also allows the cartridge to move in a substantially unimpeded manner as the record is played.

Figure 20:
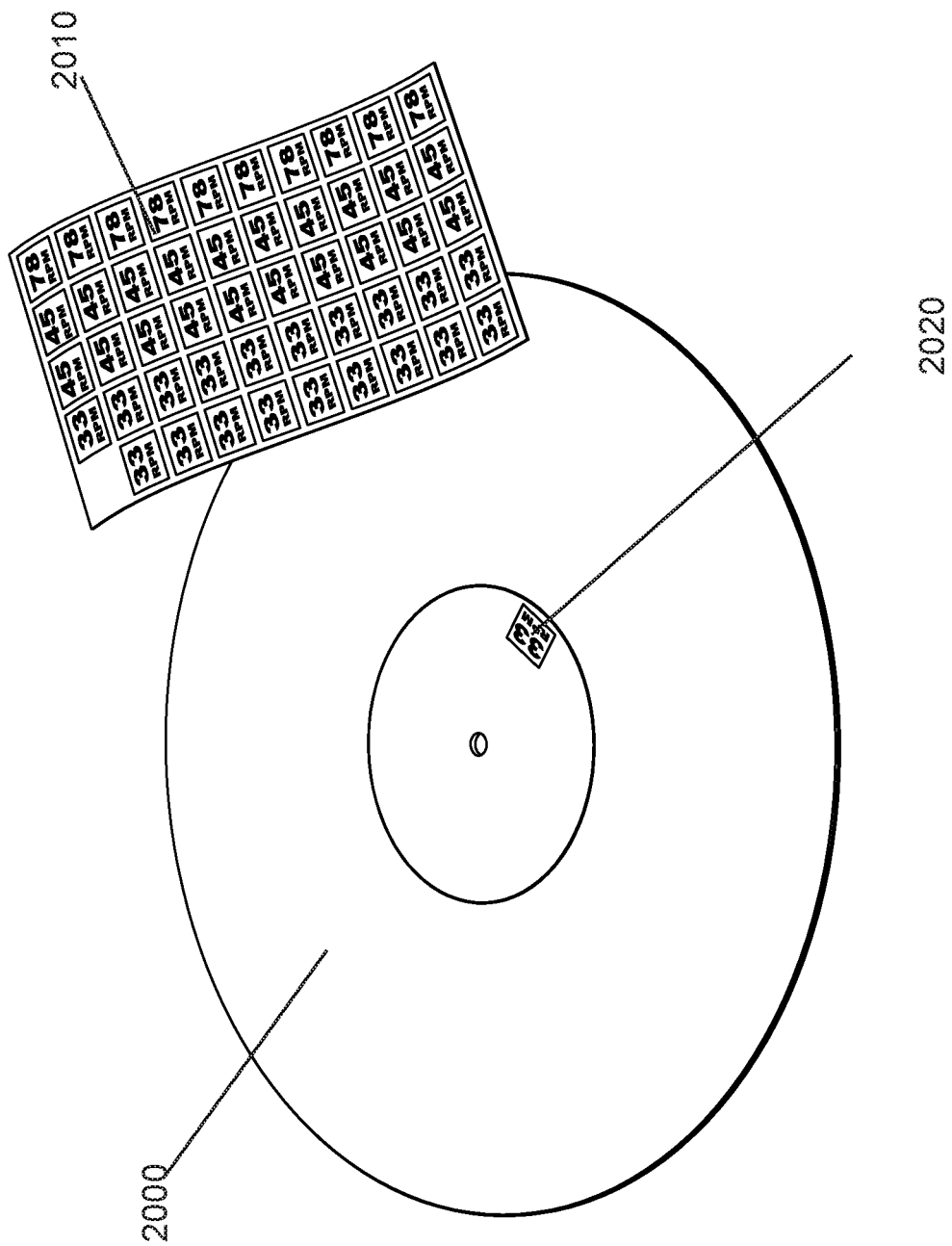
FIG. 20 is an illustration of a record label and label sheet.

FIG. 20 is an illustration of a record label and label sheet. FIG. 20 shows that the turntable device may come with a sheet of record labels 2010 that allow a user to identify the speed of record 2000 with a label 2020. In some embodiments the label may have a barcode that allows the arm to automatically determine the speed of a record.

Figure 21:
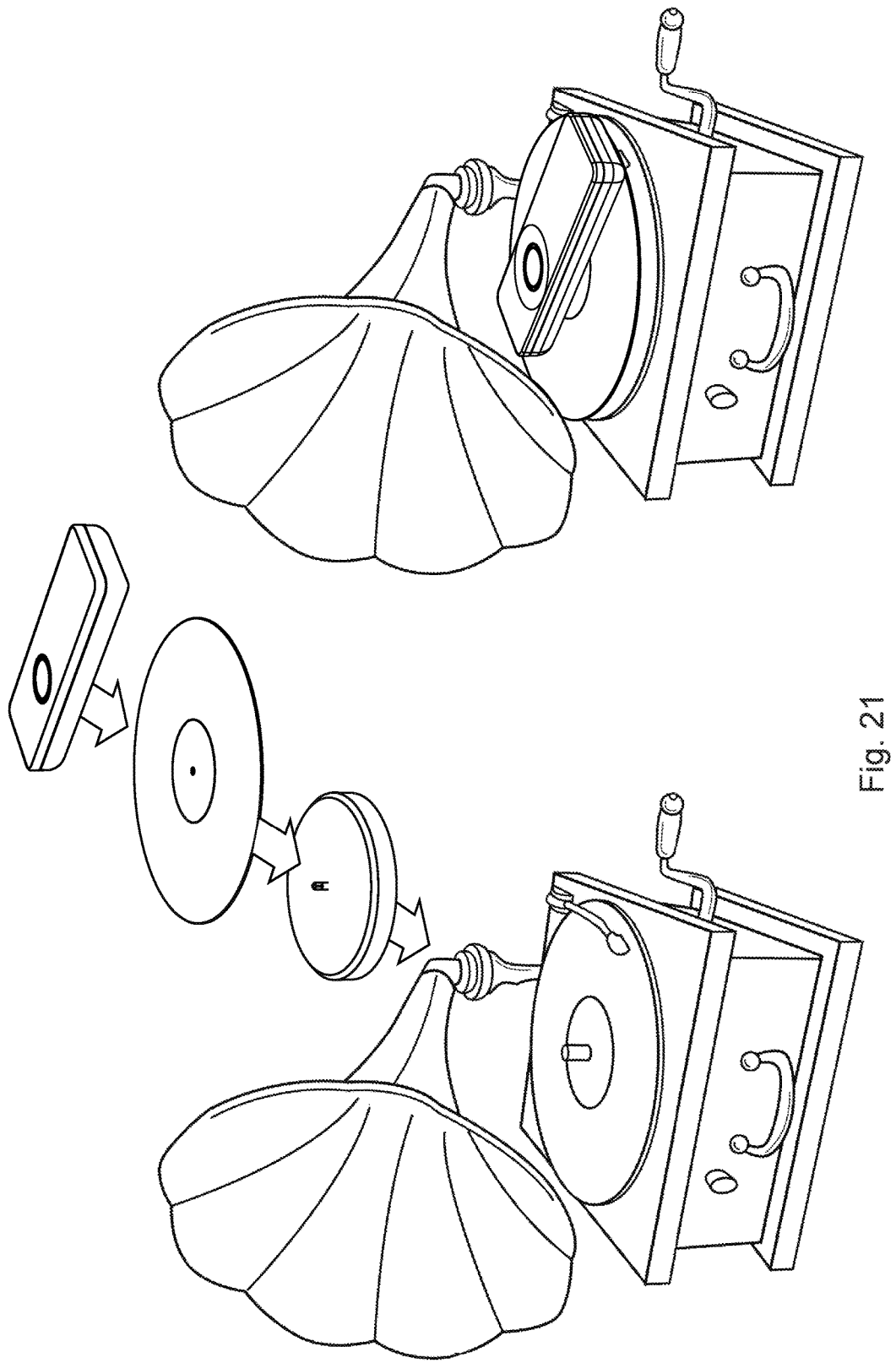
FIG. 21 is an illustration of one embodiment the turntable device and shows that it may be placed on top of a vintage phonograph.

FIG. 21 is an illustration of one embodiment the turntable device and shows that it may be placed on top of a vintage phonograph.

Figure 22:
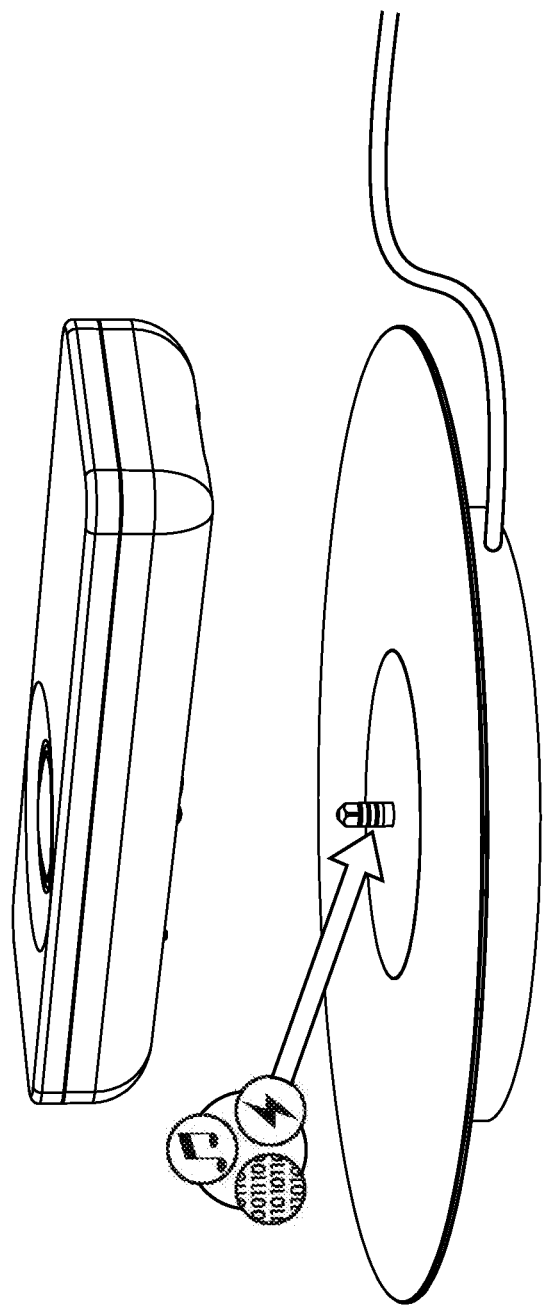
FIG. 22 is an illustration of one embodiment of the turntable device and shows that the spindle may conduct sound, power, and data to and from the arm.

FIG. 22 is an illustration of one embodiment of the turntable device and shows that the spindle may conduct sound, power, and data to and from the arm.

Figure 23:
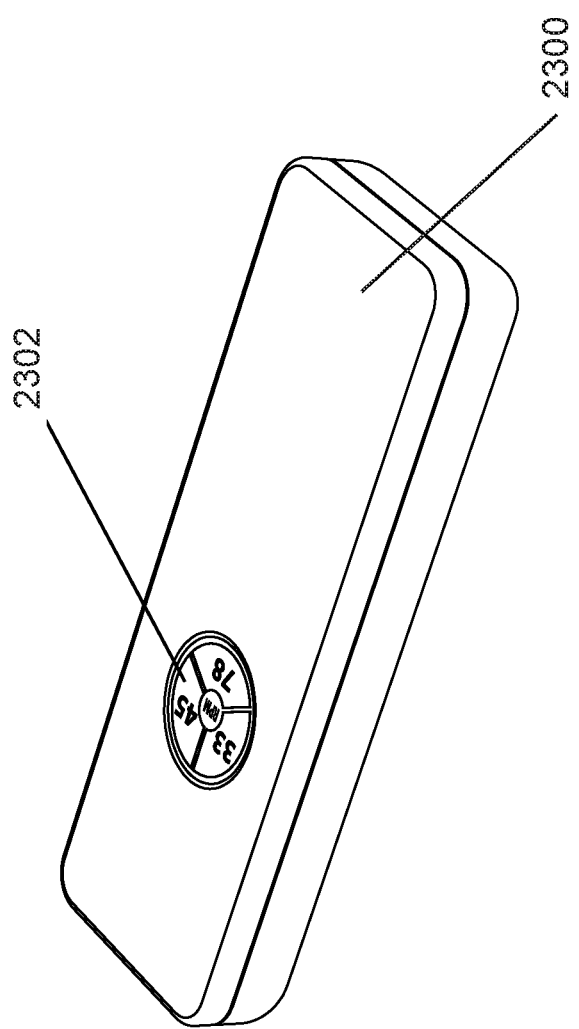
FIG. 23 is an illustration of a top perspective view of one embodiment of an arm of the turntable device and shows that the button may be a touch screen that allows the user to select a record speed.

FIG. 23 is an illustration of a top perspective view of one embodiment of an arm of the turntable device and shows that the button may be a touch screen that allows the user to select a record speed. FIG. 23 shows that arm 2300 may have a touch screen 2302. Although the touch screen 2302 shows a record speed selection, the screen may display on/off information, pause, or track selection information, or other programming/operation functions.

Additional Embodiments

In certain preferred examples of the system, the base may comprise a flange portion. The flange portion may be substantially constructed of, for example, a highly-flexible silicon, rubber, or similar washable material. The material of the flange portion of the base is preferably different from the rest of the base, in order to prevent or minimize the record from adhering to the base. The base may also be collapsible, retractable, foldable, etc. . . . to facilitate portability of the system. For weight purposes, the base may also comprise a battery and/or most of the heaviest components of the system.

In certain embodiments, the base may be manufactured inexpensively. This would allow a system "kit" to be sold along with two or more bases for each arm provided. By allowing a user to use multiple bases and records, the user may change records with minimal delay. For instance, the user may have the arm temporality engaged with a single base playing a respective record, while, at the same time, having a second base element with another record ready for quick playback. As a result, the user may move or shift the arm element from one base to the other base. In various embodiments, the bases may be designed in a variety of colors as well.

In some embodiments, the spindle may serve as an electrical contact, by which electrical power is provided to the arm. The electrical contact may also be capable of transferring sounds and data. An outer wheel toward the distal end of the arm element may also be provided to help drive the arm element about the spindle. Alternatively, the rotational position of the arm element may be driven by way of the spindle. For example, a clock engine (e.g., a 33/45/78 rpm clock engine) may be incorporated to drive the arm's rotational position by way of the spindle.

In additional embodiments of the system, most of the weight of the arm may be carried by the spindle. One or two wheels (or one or more bearing balls) may be located, for example, 3½ inches from the spindle. In such embodiments, the wheel or bearing ball may sit on a non-printed portion of the record. Should the wheel only carry the weight of the arm, without driving the wheel about the spindle, a roller ball or bearing (e.g., removable for cleaning) may also be provided instead of a wheel. In some embodiments, the wheels may be positioned near or adjacent to the stylus cartridge. While, other embodiments, the wheels may be located near or at the edge of the arm, such that the wheels may rotate on the edge of the records. Still, in other embodiments, the wheels may drive the arm on the top surface of the table or base without contacting the record.

Importantly, the wheels may function as an active component or passive component. The wheels may be an active component when the wheels are directly actuated by the motor to drive the arm. This may allow the wheel to drive the arm around clockwise or counterclockwise on the record. On the other hand, the wheel may function as a passive component by simply holding and supporting the weight of the arm without being directly driven by the motor.

In another embodiment, the base may integrate one or more magnetic elements to repel a magnet or an electromagnet located underneath the arm. This will preferably help relieve the weight of the arm from the surface of the record.

Record Size and Speed Setting

The turntable device may also be configured to scan the record info for data, track skipping, etc. . . . The turntable device may, for example, scan the record size to set the speed of the arm rotation automatically. Most records are either 7" (17 cm) or 12" (30 cm). Thus, the turntable device may automatically adapt to these record sizes to play to the appropriate record start and end locations. The same may be true with the rarer 10" (25 cm) sized record, even if this record is offered as a purchasable in-App feature.

The turntable device may also be configured to allow the user to adapt the arm speed and stylus position to accommodate the size of odd shaped record (for example: a record that has the shape of a heart) and even save the respective position data after the first time the record is played, for example, via its App. This manual feature may also be purchasable in-App.

In addition or alternatively, data from each individual record may be read by a sensor located in the arm and recorded by the system (e.g., using a dedicated software App) by way of an NFC label/sticker (or a similar inexpensive technology) applied to a record.

Because speed varies, depending on the record size (for example a 12" record may play at 45 rpm, while a 7" record may play at 33 rpm), the turntable device may preferably include a switch that is integrated with or proximal to one single button (such as the power button). As illustrated, this switch may be designed as a vintage nipple looking switch that is a part of the (power, play, skip) button. The user may have the option to switch the speed directly on the arm of the turntable device or through the associated software App. In certain embodiments of the turntable device, a 78 rpm option (for example) may come as purchasable in App option, or come from factory.

In the same fashion that each record info/data may be saved via the App for record size adaptability purposes, the App may be configured to remember the speed of each record. For example, the App may either recognize a previously-played record by its tracks scanned length or via an NFC label/sticker. Since the user that uses the dedicated App may have registered a unique account via the App, it is envisioned that such users may be capable of sharing their record info (such as a 7" record that plays at 33 rpm) with a community of registered users of the system. In certain embodiments of the turntable device and method, this capability might eliminate the need to enter/set this information manually, even when the first time the record is being played.

In certain embodiments of the turntable device, a button displaying the current length on a mini LCD (or alternative screen technology) may keep the information static/still (for example "45 rpm" remains displayed non-rotationally with regard to the user or surrounding environment) while the arm is turning and playing a record (at 45 rpm). One embodiment may have the LCD screen face still in front of the user while the arm is turning. This may be done automatically through sensors or through an in App adjustment.

Motion

Depending upon the size of the record being played, the arm may rotate about the spindle like a turntable "clock" cadenced at the corresponding record speed (e.g., 45, 33 and/or 78 rpm). Either a Linear Tracking along with (and/or not necessarily nor exclusively) a Direct Drive Fully Automatic Stereo System may be provided. However, in certain embodiments, it may be preferable to rely on magnetic movements and connections (including magnetic repulsion between the arm and the base) in order to minimize power consumption, the reliance on fragile motors, and to avoid heat generation and energy loss due to friction. In additional alternative embodiments, the cartridge may be driven similarly to those used for digital discs (e.g., CD, DVD, Blu-Ray players and the like).

Cartridge and Stylus

The cartridge and stylus may be industry standard size, so that a user can elect the cartridge and stylus of his or her choice. Adjacent to the cartridge, the turntable device may utilize a laser or an infrared sensor configured to scan the record right after powering. This may allow the arm to measure the record size, allow track skipping, and possibly work in conjunction with the App operated on a user's mobile computing device to "sound scan" the record—i.e., (1) identifying the artist and album name, and/or (2) displaying the corresponding cover art on the user's mobile computing device. In another embodiment, the App and/or turntable device may utilize an audio recognition technology, such that the App or turntable device may "listen" to the sound or song being played in order to determine the name of the artist or album. In other embodiments, the arm may resemble a watch hand and may be combined with a logo letter design, or other additive design elements. Moreover, components of the turntable device (e.g., arm) may come in, for example, as a bright red color (e.g., luxury color codes of luxury cars, etc. . . . ).

Wireless Sound

The turntable device may be configured to wirelessly transmit the sound through CD quality compression Bluetooth® APTX HD (simple codec) or Bluetooth® APTX HD (newer codec) (+Apple compatible AAC) Codec and/or through other universal formats. Additionally, a wired option may come from the factory, for example, in the form of a line out jack configured to receive a small line out connector for an optional speaker disposed on top of the arm element. In the alternative, a wired option can come as an accessory with the turntable device. Bluetooth® may be used for high fidelity audio and data/remote functions. Simple auto pairing may be implemented with last generation Bluetooth® 4.0 or later (i.e., no pairing security code required).

Power

The turntable device may be powered in various ways. For example, the turntable device may be powered by rechargeable batteries (e.g., Li-ion or the like) and/or AA, AAA standard battery sizes. The turntable device may also be powered via a wall outlet and/or even 12V power. In certain preferred embodiments, the system's battery may be charged wirelessly through the universal "Qi" wireless charging format (i.e., inductive power charging) and/or other technologies. A standard micro-USB connector for wired charging alternative may also be provided as well.

Commands

From a user's perspective, preferred embodiments of the present turntable are minimalistic in complexity and self-explanatory in their operation. This is also true of the commands. In the preferred embodiments, many of the advantages of the present turntable device are made available through a corresponding software App configured to operate on the user's mobile computing device, such as a smartphone. However, even without interfacing with a user's computing device or associated software App, preferred embodiments of the turntable system can be activated can be and begin playing without the use of a smartphone. A manual multi-task switch may be provided to unlock the cartridge, removing its protection underneath. One specific example of the operation of such a switch may be as follows: the first actuation powers on and begins play; whereas subsequent one, two, or three, etc. . . . actuations of the switch cause respective skipping of tracks automatically one, two, or three, etc. . . . tracks forward. Alternatively, a button with the very same functions can be located on top of the spindle extending upwards through the center of the record.

Like several early 1980s turntables, some of which were then called "programmable," embodiments in accordance with the present turntable device may be configured to skip track, play randomly, and/or be programmed to play vinyl records. Unlike early 1980s turntables, the key difference is that embodiments of the present disclosure may perform these functions remotely, through its dedicated software App operating, for example, on the user's own mobile computing device. This can also be done intuitively through a single button located on the top side of the arm. In various embodiments, this multi-function button may allow the turntable device to be powered on and to play (one single button press), skip to the next track (one more press, and following track each time pressed) and then turn off (e.g., by way of one long button press).

Design

In certain embodiments, the design of the arm may resemble a watch hand. However, the arm element may take on alternate shapes and designs.

Travel Size without Compromising Sound Quality

One way to carry and protect the turntable device is to use a flexible base adapted to wrap around the arm to form a stowed configuration. With this option, the base diameter may be substantially the same as the length of the arm. Optionally, a USB charging cable may be used to wrap around the components to secure the turntable device in its stowed configuration. The turntable device may then be placed inside a simple soft case to protect its components from dust.

Modularity & Future Functions/Accessories

Certain embodiment of the present turntable device may be modular, meaning that there may be a factory version versus software app add-ons and options. A standard version of the turntable device may include some or all of the following features, accessories, and/or dedicated Apps and software:

Artist, album names and/or cover art to facilitate track skipping.

Recording (e.g., via a memory card slot integrated within the arm).

App controlled alarm clock. For example, a physical clock function through the software App operating on the user's mobile computing device. The arm resembling a watch hand may indicate the time by way of printable labels that locate hours (e.g., 12, 3, 6 and 9 o'clock). This may be a default standby function.

Displaying cute and noble cultural references. (e.g. "going fishing" may be displayed on the smartphone screen while the infrared or laser sensor scans the tracks and record size before displaying their album cover and details).

The hassle/limitation of all records is the limited length of a side of a 12" or 7" record. The main advantage of owning two or more turntable devices is that the next record is ready to play immediately (or can be programmed to start automatically at the end/or cross fading when the first record has finished playing). This can be accomplished remotely, for example sitting 15 feet away from the set (if the set is not already programmed to mix automatically). If a user owns two or more complete turntable devices, these turntable devices may connect wirelessly to each another (e.g., through Bluetooth®, daisy chain, etc. . . . ), and the turntable device and mobile software App may be configured to do the mixing work for cross fading, etc. . . . This may provide undeniable visual and technical novelty, (e.g., a "disc jockey feature" may show the turntable device alternating between two systems, going back and forth). This would give the appearance of the arms dancing on top of the records on their own. The turntable devices essentially perform like a live robotic DJ!

It is all about the App: the arm may be a dancing robot that dances on a record. For a user who only owns a single turntable device in accordance with the present disclosure, the mobile device software App may be configured to mix the user's phone playlist along with the real life records played (through another pay in App). This may be particularly advantageous when the user is working out next to the system.

It is envisioned that record companies could add features to make records readable by a system as described herein to trigger additional functions (e.g., an NFC tag or the like, integrated into the vinyl record or on a dedicated sticker). One way to differentiate records may be to adhere an NFC tag to the record (e.g., a removable label—with a safe glue—that would not damage an expensive record). It may be located on the non-music/text printed portion of the record. As a result, the user may touch the record either with the arm of the turntable device or with an NFC compatible smartphone. In addition or in the alternative, a laser/IR scan may allow the turntable device to differentiate each individual record analyzing its unique tracks, without the need of an NFC or similar label.

Future embodiments of a turntable device, as described herein may be configured to play DVD, CD, Blu-Ray discs like it plays on top of record vinyl discs. The turntable device may be configured to play a proprietary format medium. The turntable device may be configured to hang, mount, and play on a vertical surface, such as a wall.

A micro-SD or similar card reader may serve as an audiophile music recorder and a record data saver. This approach may offer an alternative to App smartphone and/or Cloud saving of data.

The turntable App may be configured to require user registration in order to save the user's data through Cloud drives and have the user benefit community interaction (for example sharing of data for similar records like a track that is only available on a vinyl edition or a record speed, etc. . . . ).

It is envisioned that the potential data-saving capability that embodiments of the turntable device offer may be used to interact with third party software that would integrate that data. For example, Apple® iTunes® could integrate a "Vinyls" section along with its "Music, Podcast, Radio, etc. . . . " columns sorting. This would integrate any generation vinyl to the controversial MP3 ecosystem. Furthermore, iTunes®, or the like could double as a remote for the turntable.

Various accessories may be made available for use or incorporation with systems in accordance with the present turntable. Such accessories may include for example, one or more of the following:

A collapsible dust cover that allows the system to turn while playing and then protects the record while the system is turned off.

Multiple color versions of the base and/or arm covers or real wood (e.g., Riva Boat inspired shaped for a luxury option on the top cover).

Cleaning clip-on fixture and/or electric, remotely lifting up/down.

Protective cases for the base and arm.

Compatible accessories for Qi wireless charging.

Receiver, Bluetooth® APTX, or Bluetooth® APTX HD USB dongle or audio adapter, Bluetooth® APTX, or Bluetooth® APTX HD wireless speakers or headphones.

A non-flexible base that doubles as Qi charging pad may come as an accessory. The base element-charging base may connect to a power source through, for example, a standard micro-USB cable.

A small speaker may come as an accessory and sit on top of the arm. For example, multiple versions of the turntable device may be offered for purchase, one of which includes a 3.5 mm (+Stereo RCA adapter) Bluetooth® adapter; another which includes a Bluetooth® USB adapter; and yet another with a quality mini speaker removeably attachable to the arm.

A retrofit spindle may be provided and configured to replace the spindle of vintage turntables of all sorts, and to operate in conjunction with the arm of the present turntable device. Thus, the retrofit spindle may allow a user to play a record by way of the arm described herein with the record being supported on any generation turntable (working or not). As indicated above, depending upon the particular embodiment of the system, a base may comprise a passive spindle, or a spindle that conducts power, sound, and data. Similarly, a retrofit spindle may also be passive (e.g., non-conductive) or active (e.g., electrically conductive). With an active retrofit spindle, an arm as described herein may be used in conjunction with a living room sized turntable. Such a system configuration may allow the power from the turntable to be transmitted through the spindle to the arm, thus eliminating the need to repeatedly recharge the arm. The same arm may still be removable from the retrofit spindle and used as part of a portable system with a flexible base when desired. For arms in which the weight of the arm is to be repelled magnetically (e.g., as opposed to using an outer wheel), a retrofit spindle may be incorporated into a base, wherein the base has a flange portion with one or more flexible magnets in the shape of, for example, a circle.

Preferred Technical Specifications

Base Harbor. Silicone pad with metal central post. Record is placed on the base before present turntable device is placed on top of the record. The present turntable device keys on to the stationary post to drive the rotary movement.

Arm, Boat. Electronic device that runs on top of record. The present turntable device contains all the running gear, electrical components, power source, and record head/cartridge assembly for the device.

Corded Charger. Micro USB connector, AC to DC converter.

Preferred Steps for Use

In one embodiment, the method may comprise the steps: placing a record on a base; selecting a speed setting (on the bottom of the base) (this is optional if the speed is already set correctly); placing the present turntable device on the base; starting play at a first track, wherein the present turntable device automatically determines the size and starting point of the record, and begins playing at track 1 or the desired track. If used in conjunction with an App, smart device screen may display "[TRADEMARK Turntable device] is going fishing" before playback begins. Alternatively, the user may also press the main button to hold/mute, press the main button x times to skip to the $x^{th}$ track, press and hold the main button for a set period of time (e.g., 3 seconds) to turn off the machine.

Usability Features/Overall Specifications

The standard features of the turntable device include, engaging the present turntable device on the base and pressing one button to start playing, skip tracks, mute, and turn off the device. The present turntable device may also have: (1) a laser sensor for edge/groove detection; (2) a second switch or button for selecting an RPM speed; and (3) the ability to skip one or more tracks. The record is preferably stationary while the present turntable device rotates around the record. Preferably, the silicone pad base is not larger than 7" in diameter and is very thin (e.g., 0.13") with a 7 mm post diameter, and may have a round lower portion and a square upper portion. The present turntable arm may be about 10" long, 3.5" wide, and 1.5" thick. Accordingly, the turntable device may be portable. The present turntable device may be connected by Wi-Fi 33® and/or Bluetooth®.

Additional features and accessories may include: multiple bases for quick record swapping, (i.e., just moving the record on the present turntable device to the next base); wireless charging base; designer shapes and colors; a dust cover; cleaning attachment; remote control; cartridge upgrades; and a related smartphone App.

The smartphone App may feature: a remote control; 78 RPM record speed unlock; allowing the present turntable device to act as a clock or alarm clock; digital record playback; sharing digital playback; sharing digital recordings; allowing digital manipulation or effects such as DJ scratching; one touch skip(s); album cover art; gamification/game interaction; Near Field Capacity interactive options; and record speed labels, for automatic determination of at what speed the record operates.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. A turntable device, comprising:
a base having a pad and a spindle; and
an arm; wherein said arm comprises:
  a housing;
  one or more buttons;
  a spindle engagement portion;
  a stylus cartridge;
  a power supply;
  one or more wireless communication devices;
  a linear actuator;
  a motor; and
  a vertical solenoid;
wherein said base is adapted to receive a phonographic record;
wherein said spindle engagement portion engages with said spindle, such that said arm is entirely supported above said base via said spindle;
wherein said motor drives said spindle engagement portion, such that said arm revolves around said base at said spindle;
wherein said linear actuator is configured to move said stylus cartridge along a length of said arm;
wherein said vertical solenoid is configured to allow a stylus of said stylus cartridge to engage with said phonographic record that is loaded on said base.

2. The turntable device of claim 1, wherein said arm further comprises one or more sensors;
wherein said one or more sensors are configured to cause said linear actuator to move said stylus cartridge along said length of said arm in order to begin a desired track on said phonographic record.

3. The turntable device of claim 2, wherein said arm is configured to automatically determine a speed of said phonographic record.

4. The turntable device of claim 2, wherein said arm further comprises a speed switch that allows a user to manually select a revolution speed that conforms with a speed of said phonographic record.

5. The turntable device of claim 2, wherein said one or more buttons is a single button that allows a user to control a plurality of operating functions of said arm;
wherein said plurality of operating functions of said arm are selected from the group of operating functions consisting of: turning on; turning off; selecting a specific track; skipping one or more tracks; pausing; and muting.

6. The turntable device of claim 2, wherein said one or more buttons is a display touch screen.

7. The turntable device of claim 6, wherein said display touch screen allows a user to control a plurality of operating functions of said arm;
wherein said plurality of operating functions of said arm are selected from the group of operating functions consisting of: turning on; turning off; selecting a specific track; skipping one or more tracks; pausing; and muting.

8. The turntable device of claim 2, wherein said base further comprises one or more base magnets;

wherein said arm further comprises one or more arm magnets;

wherein said one or more arm magnets and said one or more base magnets are configured to allow said arm to revolve on said phonographic record in a supported manner but without having any portion of said turntable device other than said stylus touch a top face of said phonographic record.

9. The turntable device of claim 2, wherein said arm further comprises a circuit board;

wherein said one or more wireless communication devices are coupled to said circuit board and are configured to send and receive signals from one or more computing devices.

10. The turntable device of claim 9, wherein said one or more computing devices comprise a software application.

11. The turntable device of claim 10, wherein said software application is configured to allow a user to control a plurality of operating functions of said arm from said one or more computing devices;

wherein said plurality of operating functions of said arm are selected from the group of operating functions consisting of: turning on; turning off; selecting a specific track; skipping one or more tracks; selecting a record speed; alarm clock function; pausing; and muting.

12. The turntable device of claim 11, wherein said one or more computing devices are one or more mobile smartphones.

13. The turntable device of claim 10, wherein said software application further comprises a DJ scratching function.

14. The turntable device of claim 2, wherein said base further comprises a port and a cable;

wherein said port is configured to connect to a power cord;

wherein said cable is configured to connect to said port and to said spindle;

wherein said base is configured to provide power to said arm.

15. The turntable device of claim 2, wherein said power supply of said arm is a battery;

wherein said base further comprises a port and a cable;

wherein said port is configured to connect to a power cord;

wherein said cable is configured to connect to said port and to said spindle; and wherein said base is configured to provide power to said arm, such that said battery is recharged.

16. The turntable device of claim 2, wherein said base further comprises a port and a cable;

wherein said port is configured to connect to an external device;

wherein said cable is configured to connect to said port and to said spindle; and wherein said base is configured to allow said arm to send or receive data or sound to said external device.

17. The turntable device of claim 16, wherein said external device is selected from the group of external devices consisting of: speakers; headphones; and one or more computing devices.

18. The turntable device of claim 2, wherein said arm further comprises one or more ports.

19. The turntable device of claim 18, wherein said one or more ports are a micro USB and a micro SD.

20. A turntable device, comprising:
a base having a pad and a spindle; and
an arm, comprising:
  a housing;
  one or more buttons;
  a spindle engagement portion;
  a stylus cartridge;
  a power supply;
  one or more wireless communication devices;
  a linear actuator;
  a motor;
  a vertical solenoid; and
  one or more support wheels wherein said base is adapted to receive a phonographic record;

wherein said spindle engagement portion engages with said spindle;

wherein said one or more support wheels are positioned such that they do not engage with a playing surface of said phonographic record;

wherein said motor drives said spindle engagement portion, such that said arm revolves around said base at said spindle;

wherein said linear actuator is configured to move said stylus cartridge along a length of said arm;

wherein said vertical solenoid is configured to allow a stylus of said stylus cartridge to engage with said phonographic record that is loaded on said base.

* * * * *